United States Patent
Bertolini et al.

(10) Patent No.: US 12,516,870 B2
(45) Date of Patent: Jan. 6, 2026

(54) INTERNAL WATER DISPENSER LOCATED IN THE HOUSING OF A LIGHT MODULE IN A DOMESTIC REFRIGERATOR

(71) Applicants: BSH Home Appliances Corporation, Irvine, CA (US); BSH Hausgeräte GmbH, Munich (DE)

(72) Inventors: Nilton Bertolini, Clinton, TN (US); Jorge Carlos Montalvo Sanchez, Knoxville, TN (US); Conner Wainauski, Knoxville, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 653 days.

(21) Appl. No.: 17/158,051

(22) Filed: Jan. 26, 2021

(65) Prior Publication Data
US 2022/0235999 A1 Jul. 28, 2022

(51) Int. Cl.
F25D 23/12 (2006.01)
F25D 27/00 (2006.01)

(52) U.S. Cl.
CPC ........... *F25D 23/126* (2013.01); *F25D 27/00* (2013.01)

(58) Field of Classification Search
CPC ...... F25D 23/126; F25D 27/00; F25D 23/028; B67D 2001/1483; B67D 2210/00036
USPC ........................................................ 62/389
See application file for complete search history.

(56) References Cited

U.S. PATENT DOCUMENTS

| | | | | |
|---|---|---|---|---|
| 3,991,911 A | * | 11/1976 | Shannon | G07F 13/065 222/25 |
| 7,543,453 B2 | * | 6/2009 | Boarman | G01F 13/006 62/98 |
| 8,109,301 B1 | | 2/2012 | Denise | |
| 8,333,084 B2 | | 12/2012 | Park | |
| D694,293 S | | 11/2013 | Eby et al. | |
| 8,827,477 B2 | | 9/2014 | Doering et al. | |
| 9,285,159 B2 | | 3/2016 | Kim | |
| 9,488,406 B2 | | 11/2016 | Grzyb et al. | |
| 9,890,029 B2 | * | 2/2018 | Comsa | B67D 1/1238 |
| 10,407,290 B2 | | 9/2019 | Sanchez et al. | |
| 10,663,160 B2 | | 5/2020 | Lux et al. | |
| 10,684,068 B1 | | 6/2020 | Shi et al. | |
| 10,739,063 B2 | * | 8/2020 | Shi | F25D 23/04 |
| 10,829,361 B1 | | 11/2020 | Denise | |
| 10,976,098 B2 | * | 4/2021 | Temizkan | F25D 23/126 |
| 11,788,787 B2 | * | 10/2023 | Choi | F25D 23/126 62/389 |
| 2007/0044497 A1 | * | 3/2007 | Roo | F25D 27/005 62/126 |
| 2008/0163641 A1 | * | 7/2008 | Mitchell | B67D 1/0875 239/18 |
| 2008/0202147 A1 | * | 8/2008 | Lim | F25D 23/126 62/441 |

(Continued)

*Primary Examiner* — Charles P. Cheyney
(74) *Attorney, Agent, or Firm* — Michael E. Tschupp; Andre Pallapies; Brandon G. Braun

(57) ABSTRACT

A refrigerator includes a fresh food compartment defined by a top wall, a bottom wall, a rear wall, two side walls, and at least one door; a light module having a housing and being disposed in or on at least the rear wall or one of the two side walls of the fresh food compartment; and a water dispenser located in the housing of the light module, the water dispenser being accessible from inside the fresh food compartment.

18 Claims, 22 Drawing Sheets

(56) References Cited

U.S. PATENT DOCUMENTS

| | | | |
|---|---|---|---|
| 2010/0175417 A1* | 7/2010 | Kim | F25D 23/126 62/389 |
| 2012/0103000 A1* | 5/2012 | Krause | F25D 23/126 222/113 |
| 2012/0103001 A1 | 5/2012 | Krause et al. | |
| 2012/0180517 A1* | 7/2012 | Filho | F25D 23/126 62/389 |
| 2012/0318723 A1* | 12/2012 | Guess | C02F 1/001 210/85 |
| 2019/0339004 A1* | 11/2019 | Signorino | F21V 3/00 |
| 2020/0182524 A1* | 6/2020 | Scalf | F25D 23/126 |
| 2021/0180853 A1* | 6/2021 | Choi | B67D 3/0038 |
| 2024/0085091 A1* | 3/2024 | Lee | F25D 27/005 |

\* cited by examiner

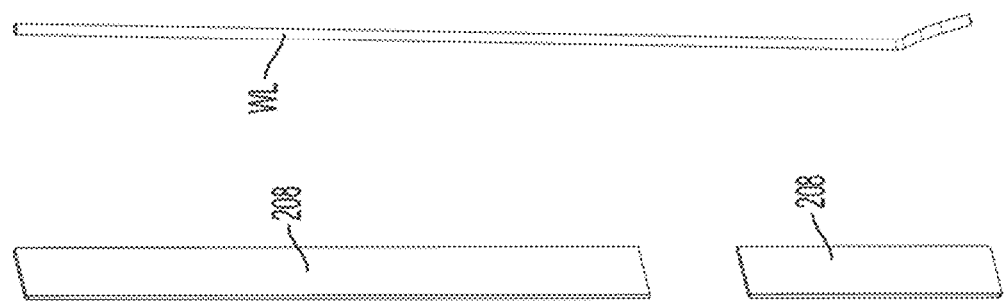
FIG. 5E  FIG. 5D  FIG. 5C
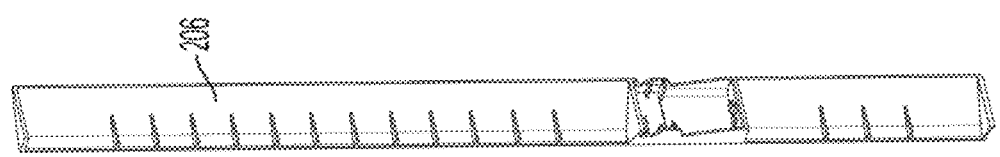
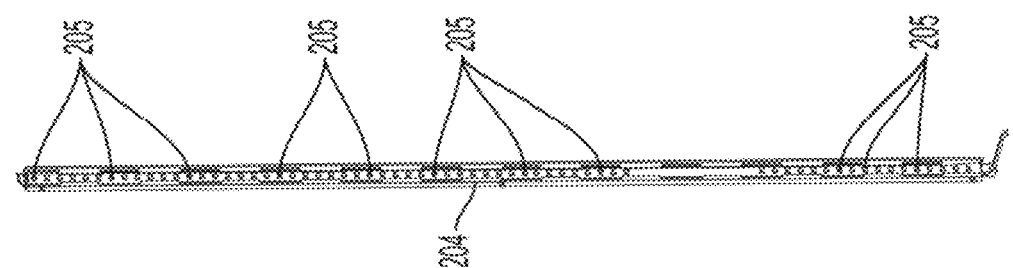
FIG. 5B
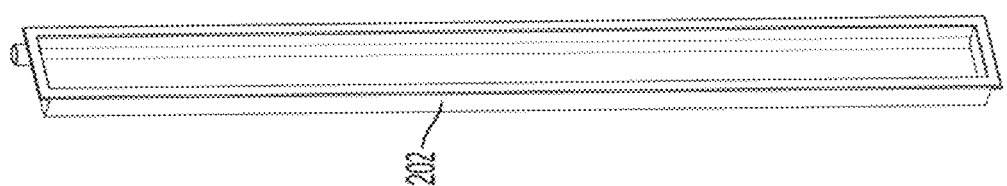
FIG. 5A

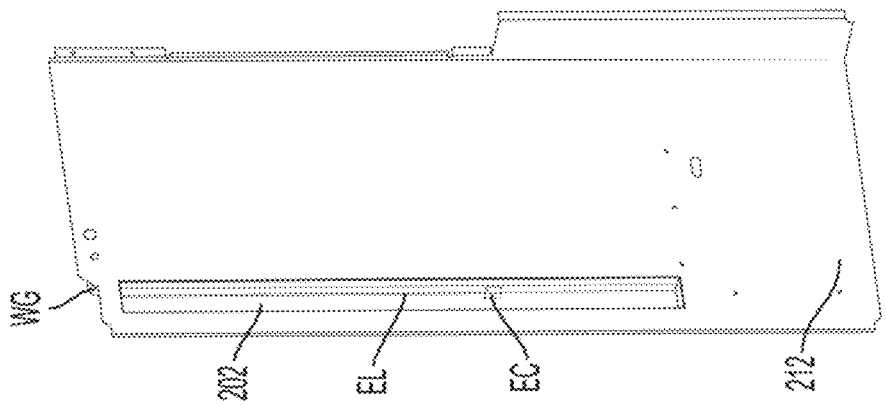
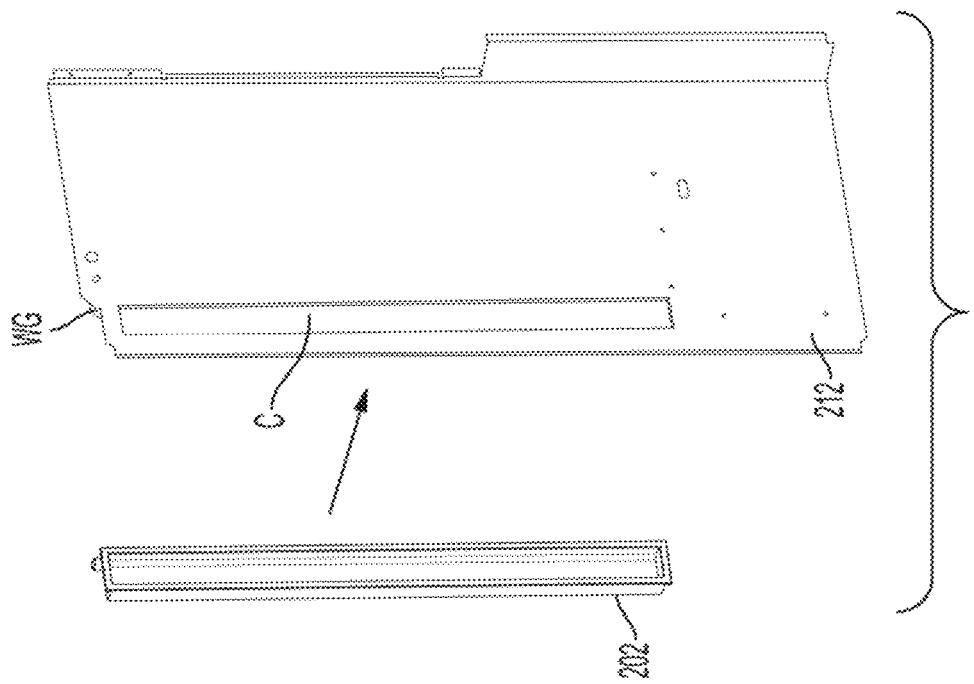

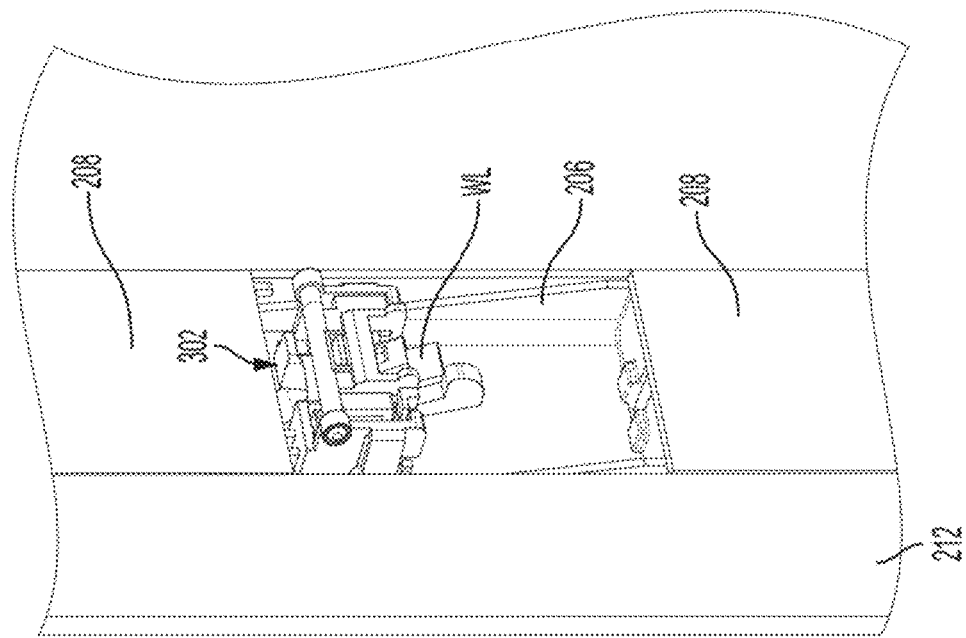
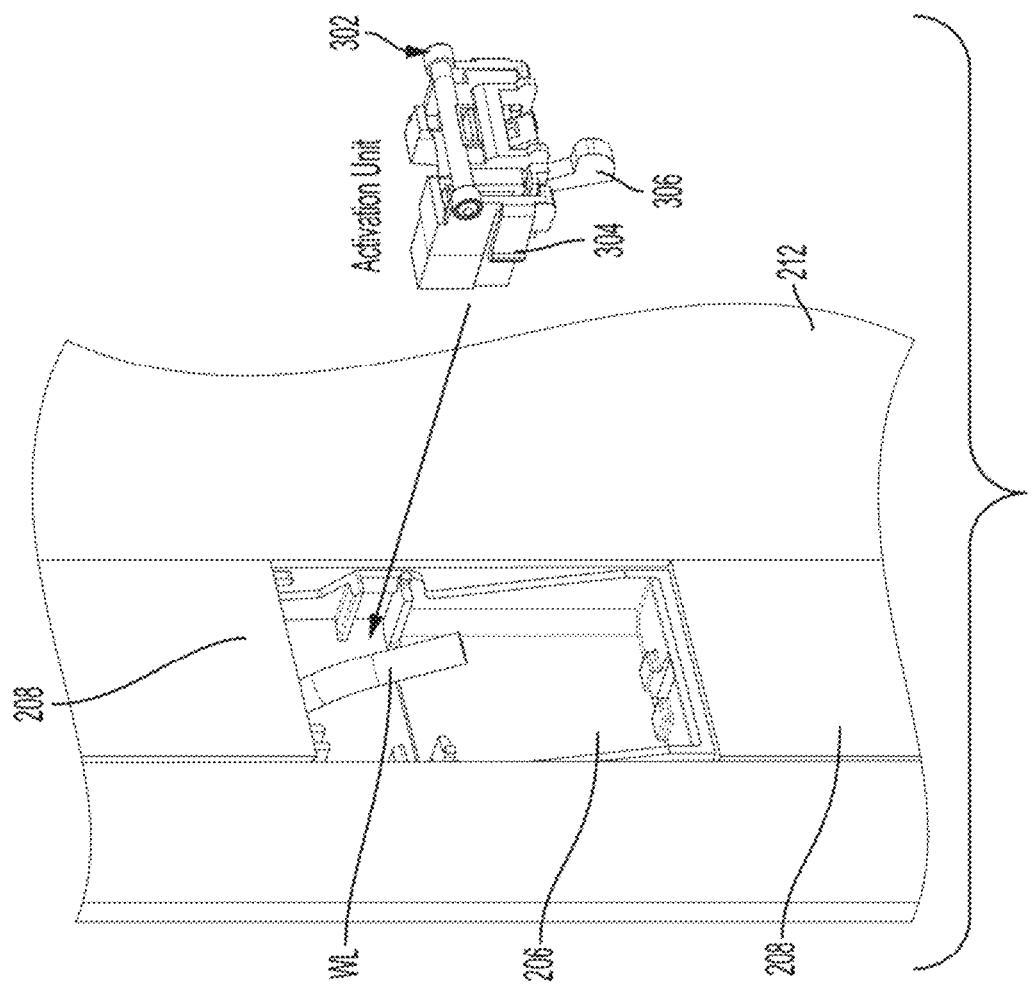
FIG. 13A
FIG. 13B

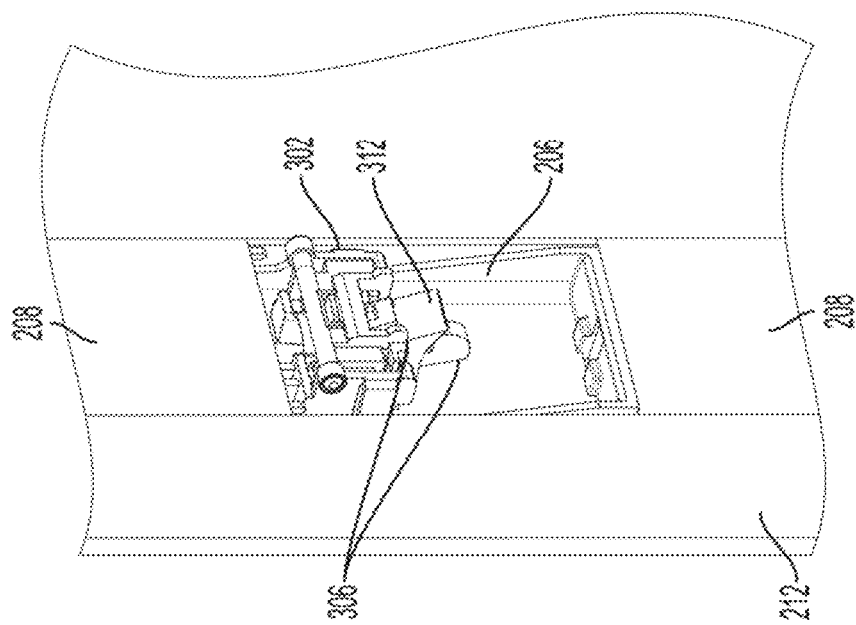
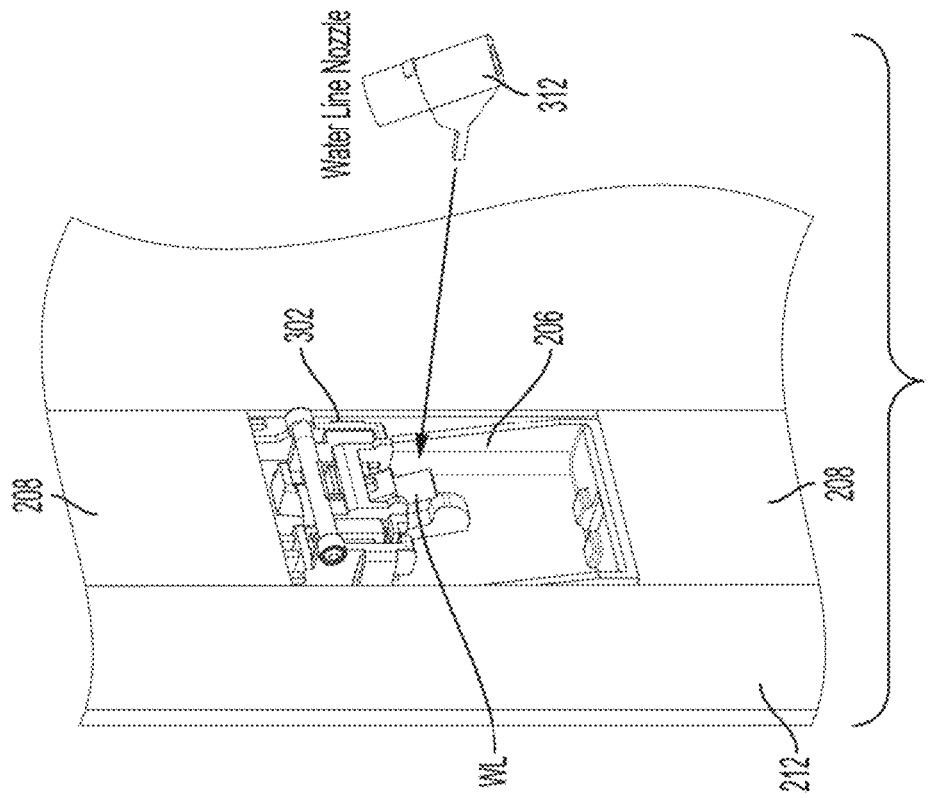

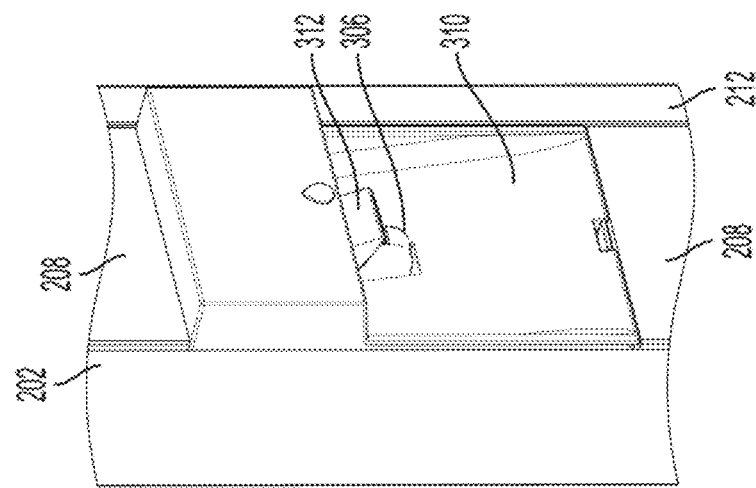
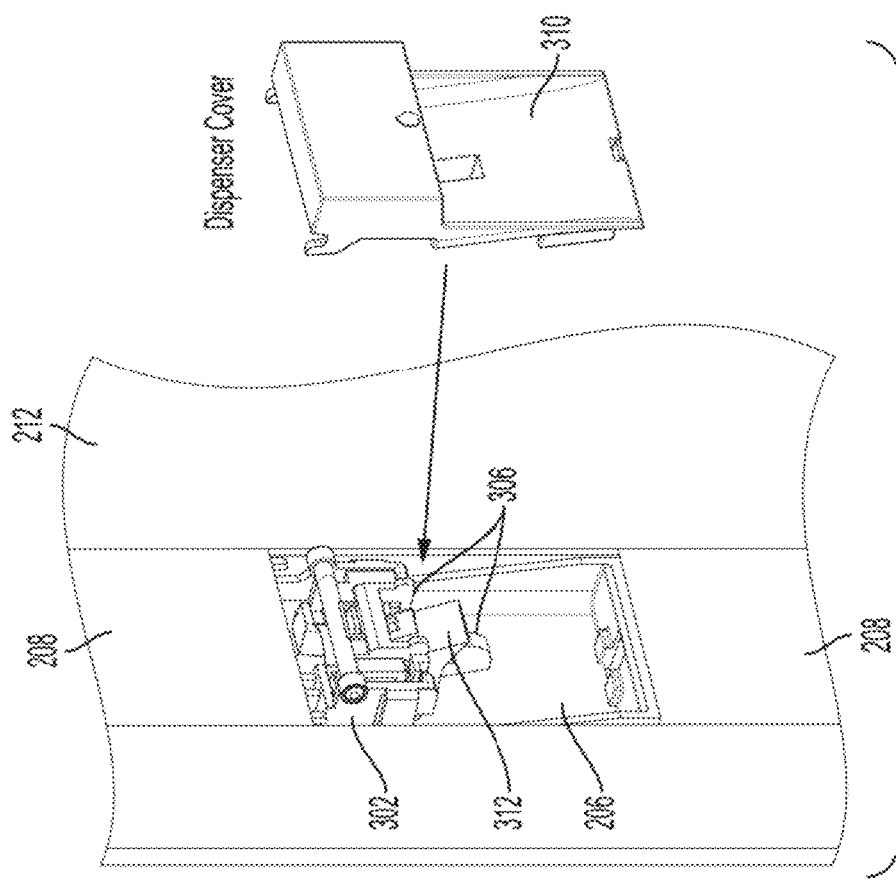
FIG. 15A
FIG. 15B

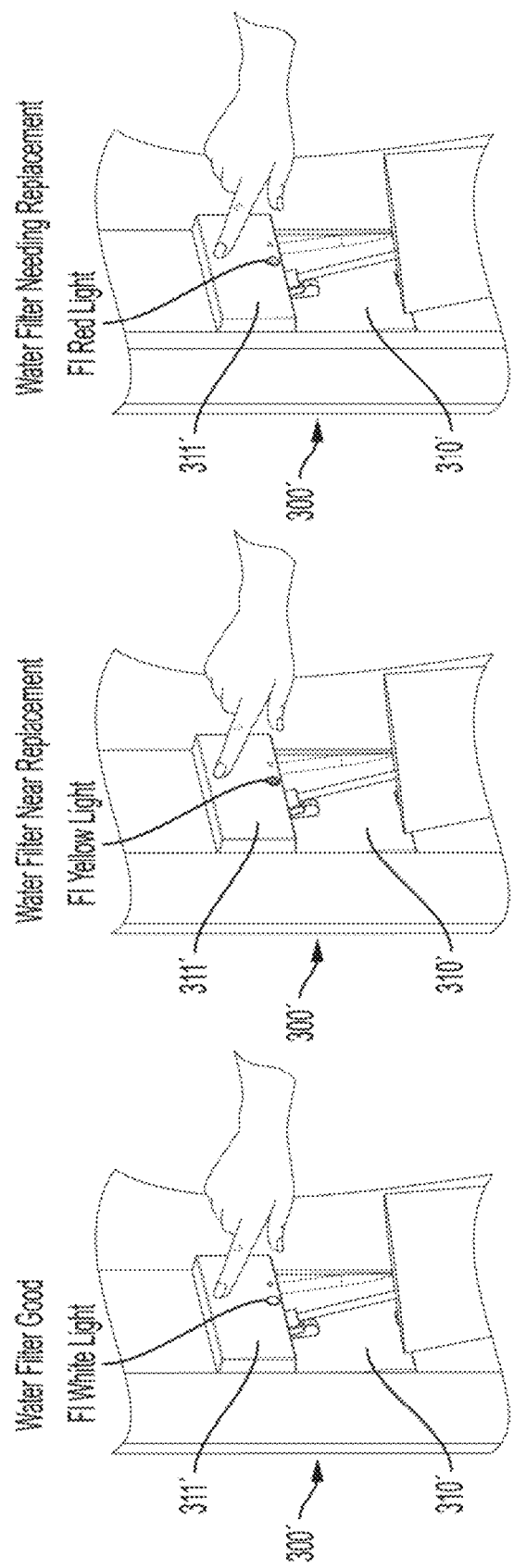

INTERNAL WATER DISPENSER LOCATED IN THE HOUSING OF A LIGHT MODULE IN A DOMESTIC REFRIGERATOR

FIELD OF THE INVENTION

The present disclosure relates generally to a refrigerator appliance and to a wall light-integrated water dispenser for the refrigerator appliance.

More particularly, the present disclosure relates to an internal water dispenser located in the housing of a light module in the fresh food compartment of the refrigerator appliance.

BACKGROUND OF THE INVENTION

In general, water dispensers can be of an external type having an external dispenser cavity located in a cutout formed in a door of the freezer compartment or fresh food compartment, or of an internal type and located within the fresh food compartment of a refrigerator appliance.

There are known internal water dispensers that are disposed in cutouts formed in an inner sidewall of the fresh food compartment or formed as a separate housing disposed against the inner side wall of the fresh food compartment. The water dispenser can be combined with an ice maker.

Both of the known external and internal water dispensers thus either require large cutouts in the door or sidewall of the refrigerator liner for placement of the dispenser or take up a large amount of space within the fresh food compartment including internal door space. Also, known internal water dispensers must compete with space used for internal lighting of the fresh food compartment. These factors make the currently available water dispensers for refrigerators complicated to manufacture and unsuitable for an optimal consumer experience in a typical household.

SUMMARY OF THE INVENTION

However, there is currently no refrigerator appliance, in particular a domestic or home refrigerator appliance, on the market with an internal water dispenser that is completely integrated into a light module. The present inventors have found that consumers prefer an ergonomic placement of an internal water dispenser in the fresh food compartment; however, at the same time, component layout with lighting and water routing present challenges to achieve the goal of ergonomic placement of the internal water dispenser.

An apparatus consistent with the present disclosure is directed to providing an internal water dispenser located in the housing of a light module for a refrigerator appliance, and to a refrigerator appliance having a light water dispenser module.

An apparatus consistent with the present disclosure provides the consumer with filtered water while conserving space inside the fresh food compartment for goods. Furthermore, the consumer gains internal door space usually taken up by an external dispenser cavity. As such, the ideal aesthetics of a seamless inner liner surface and external door panel is maintained. The present inventors have determined that as panel front type refrigeration and freezer options become more prevalent, an innovative internal water dispenser will be in consumer demand.

With an apparatus consistent with the present disclosure, since the water dispenser is located within the light module, there is no longer an issue with integrating a light and water dispenser onto the same surface. Furthermore, the present invention's flexibility provides the opportunity to optimize the ergonomics of the water dispenser without competing with a light module for placement on an inner surface of the refrigeration compartment. Still further, the present invention utilizes the light housing as a conduit to protect and guide the water line to the water dispenser.

An apparatus consistent with the present disclosure preferably utilizes a paddle and a button for activation. The paddle is for glasses or small containers and the button is for large containers.

According to one aspect, the present disclosure provides a refrigerator comprising: a fresh food compartment defined by a top wall, a bottom wall, a rear wall, two side walls, and at least one door; a light module having a housing and being disposed in or on at least the rear wall or one of the two side walls of the fresh food compartment; and a water dispenser located in the housing of the light module, the water dispenser being accessible from inside the fresh food compartment.

According to another aspect, the water dispenser located in the housing of the light module is disposed on a left side wall of the two side walls of the fresh food compartment.

According to another aspect, the light module comprises a plurality of light emitting diodes (LEDs).

According to another aspect, the plurality of LEDs comprises an LED strip.

According to another aspect, the housing of the light module comprises a foamed-in housing, and the LED strip extends over substantially an entire length of the foamed-in housing.

According to another aspect, a water line is routed through a water guiding conduit and comes through a top of the foamed-in housing.

According to another aspect, the light module comprises a light diverter and dispenser housing that is disposed in the foamed-in housing and secured thereto, such that the light diverter and dispenser housing creates a water line guiding conduit for the water line.

According to another aspect, the water dispenser includes an activation housing having an activation paddle which activates an activation switch, and a water line nozzle.

According to another aspect, the housing of the light module comprises a foamed-in housing, wherein the light module comprises a light diverter and dispenser housing that is disposed in the foamed-in housing and secured thereto, and wherein the water dispenser includes a dispenser cover that is assembled into the light diverter and dispenser housing, so as to substantially cover the water dispenser except for the water line nozzle and the activation paddle.

According to another aspect, the water dispenser comprises an activation button, such that a user can press or touch a front face of the dispenser cover at a location above the water line nozzle to dispense water.

According to another aspect, the water dispenser includes a dispenser cover having a front face, and the front face of the dispenser cover has a portion that is illuminated by light emitting diodes, such that whenever a user dispenses water, the portion on the front face illuminates and changes color to alert the user of a water filter status.

According to another aspect, the light module comprises a lower light emitting diode strip that is configured to create a time based filling effect by illuminating sequentially upwardly as a container is filled with water.

According to another aspect, the light module comprises a user interface that is configured to control functionalities of the refrigerator.

According to another aspect, the user interface is configured to present a customized filling option to a user.

According to another aspect, the refrigerator comprises a user interface configured to present a customized filling option to a user.

According to another aspect, the present disclosure provides a wall light-integrated water dispenser for use inside a refrigerator appliance, the wall light-integrated water dispenser comprising: a light module having a housing and configured to be disposed in or on a wall of a fresh food compartment; and a water dispenser integrated with the housing of the light module.

According to another aspect, the water dispenser integrated with the housing of the light module is configured to be disposed on a left side wall of the fresh food compartment.

According to another aspect, the light module comprises a plurality of LEDs.

According to another aspect, the plurality of LEDs comprises an LED strip.

According to another aspect, the housing of the light module comprises a foamed-in housing, and the LED strip extends over substantially an entire length of the foamed-in housing.

According to another aspect, the present disclosure provides a method of producing a light-integrated water dispenser module, comprising the steps of: assembling a foamed-in housing to an insulated side of a side wall inner liner of a refrigerator appliance through a cutout in the side wall inner liner; assembling a water guiding conduit to a top of the foamed-in housing and routing an electrical line having an electrical connector on an end thereof from at least one of the top or bottom of the foamed-in housing; adding insulation to the refrigerator appliance, so as to permanently fix the foamed-in housing and water guiding conduit in the side wall inner liner of the refrigerator appliance; routing a water line through the water guiding conduit and through a top of the foamed-in housing; assembling a light emitting diode (LED) strip to the foamed-in housing and connecting the LED strip to the electrical connector; assembling a light diverter and dispenser housing to the foamed-in housing; assembling a light diffuser to the light diverter and dispenser housing; assembling a water dispenser to the light diverter and dispenser housing; and assembling a water dispenser cover into the light diverter and dispenser housing.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 7B:
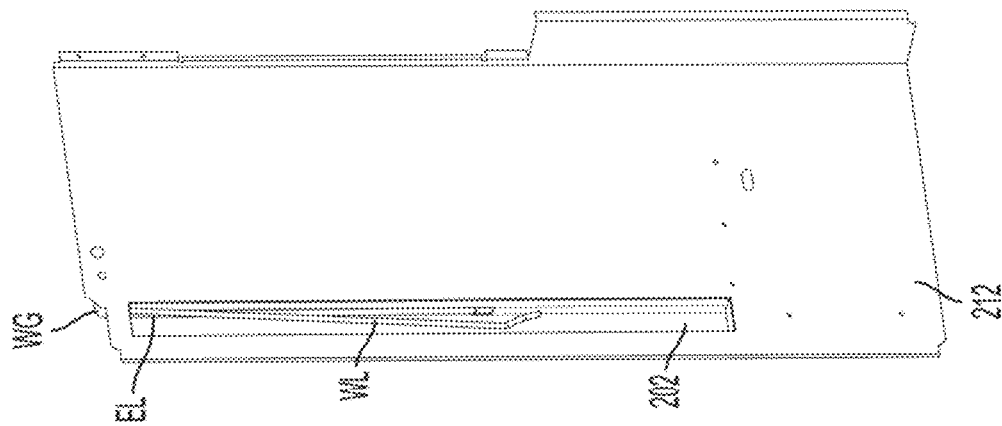
Figure 7A:
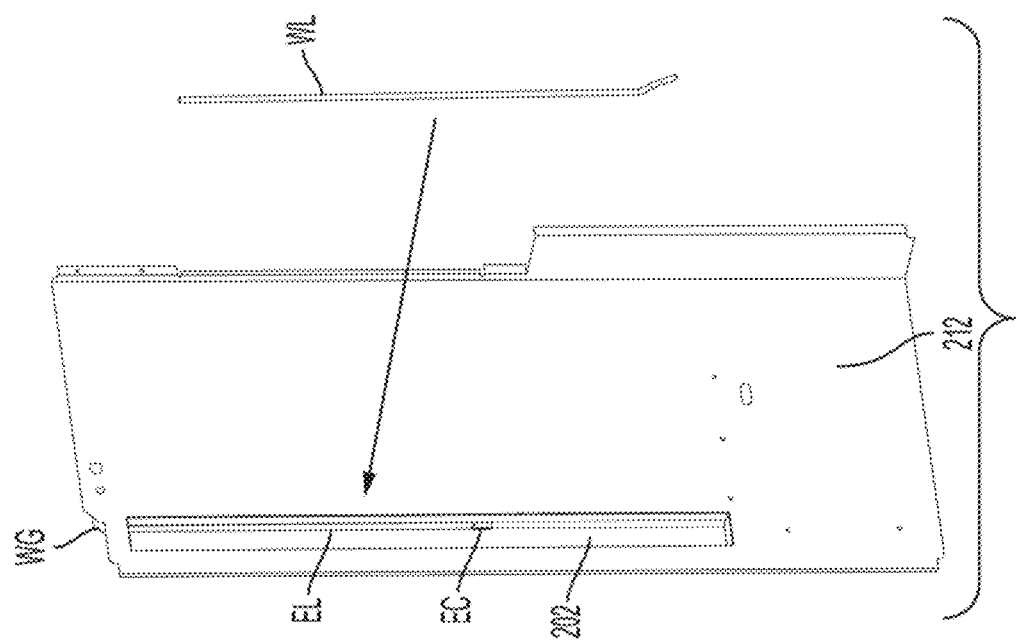
Figure 8B:
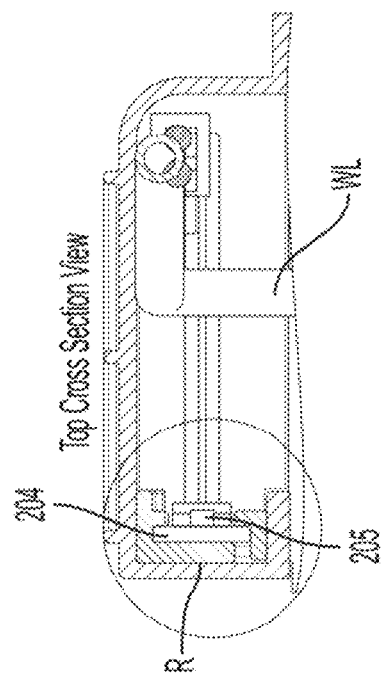
Figure 8A:
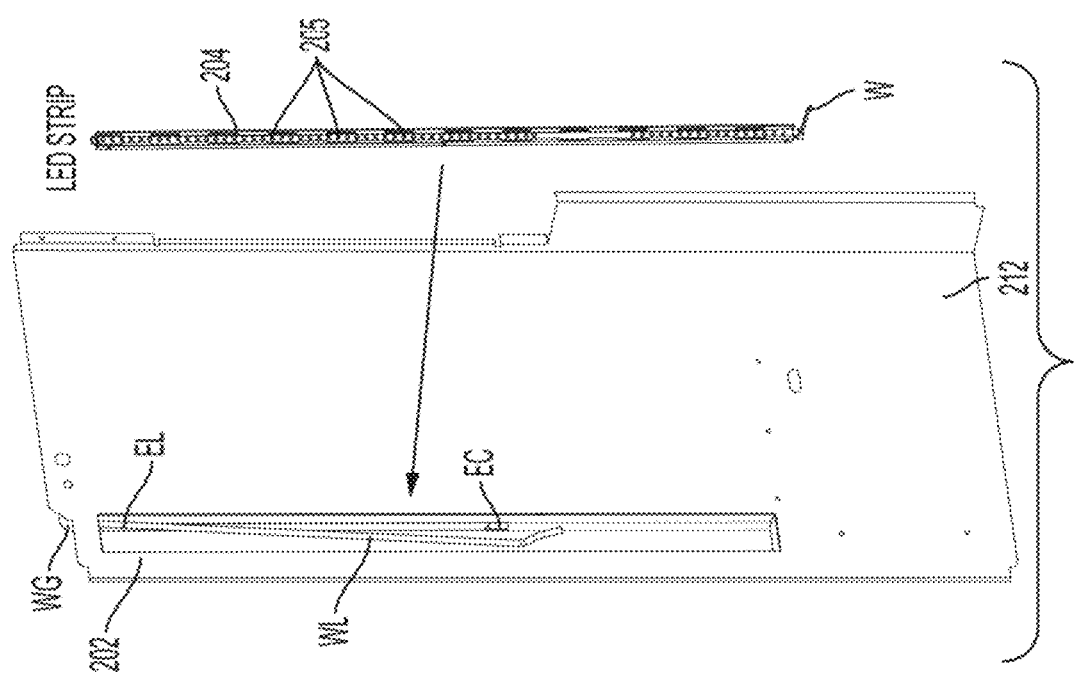
Figure 9A:
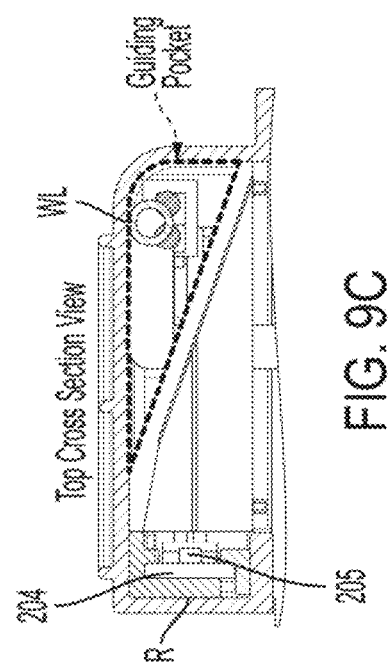
Figure 9B:
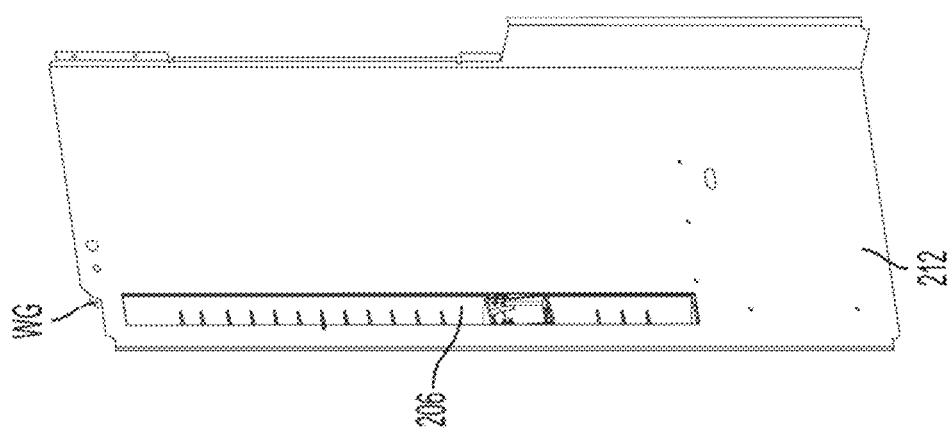
Figure 9C:
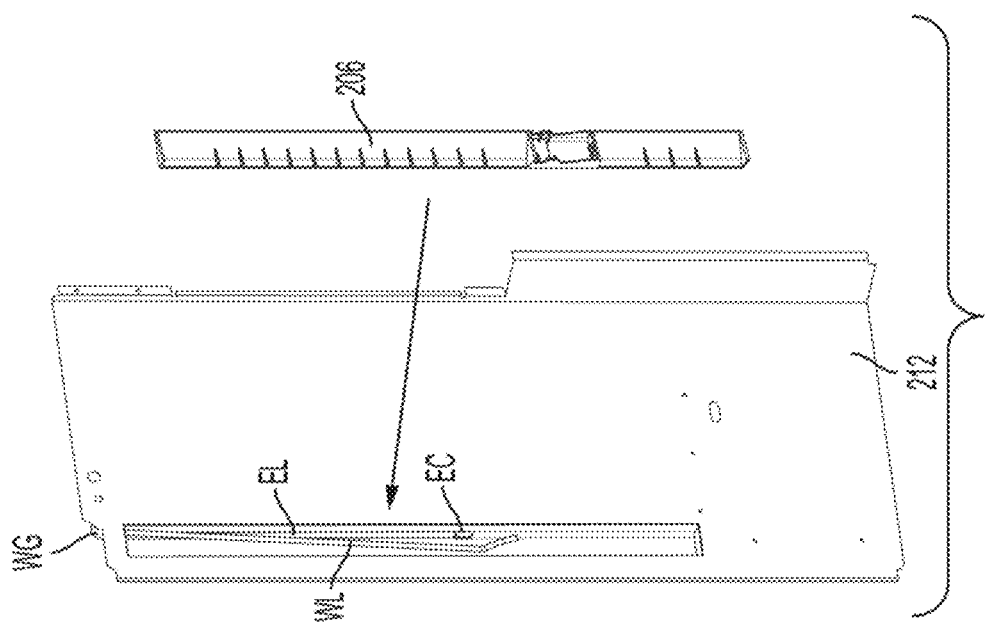
Figure 10A:
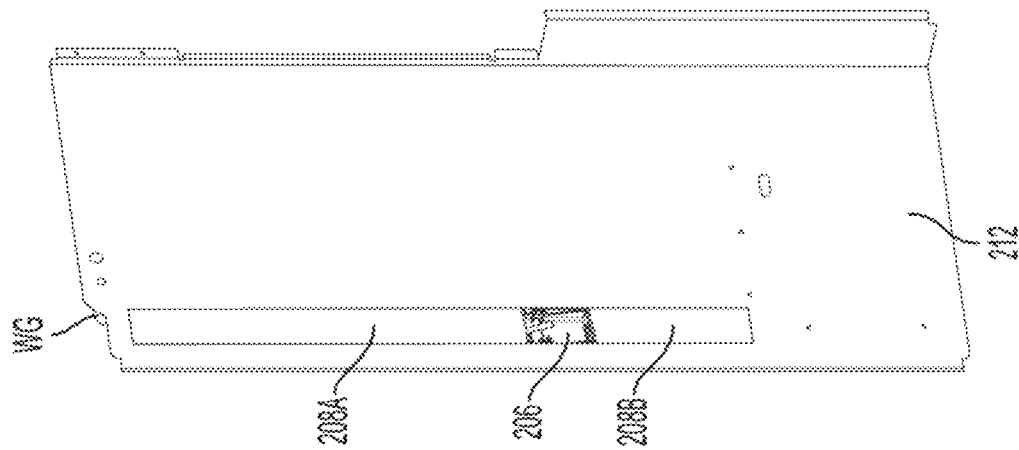
Figure 10B:
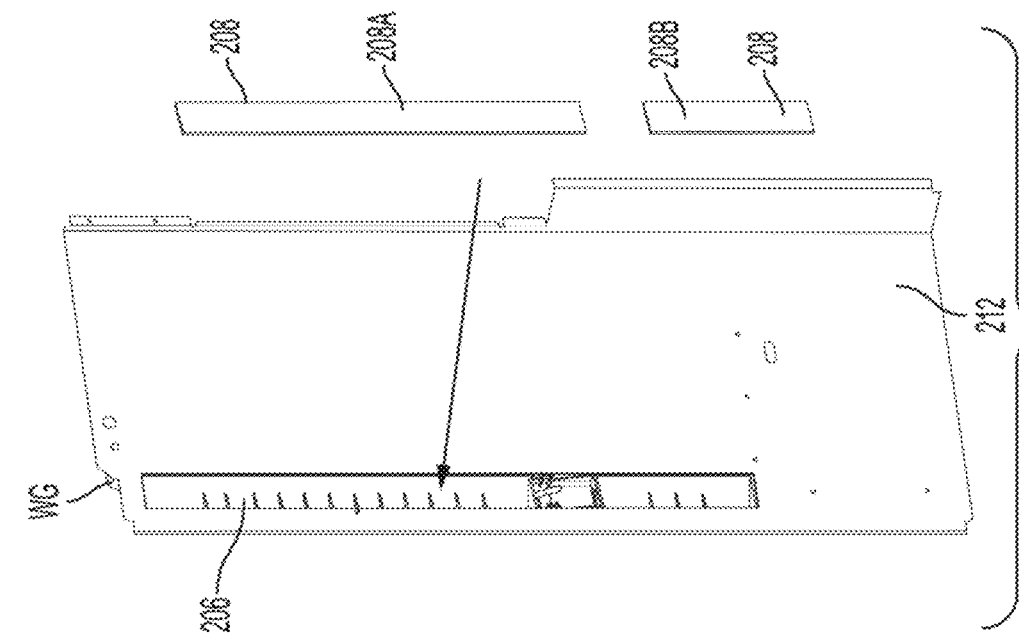
Figure 11:
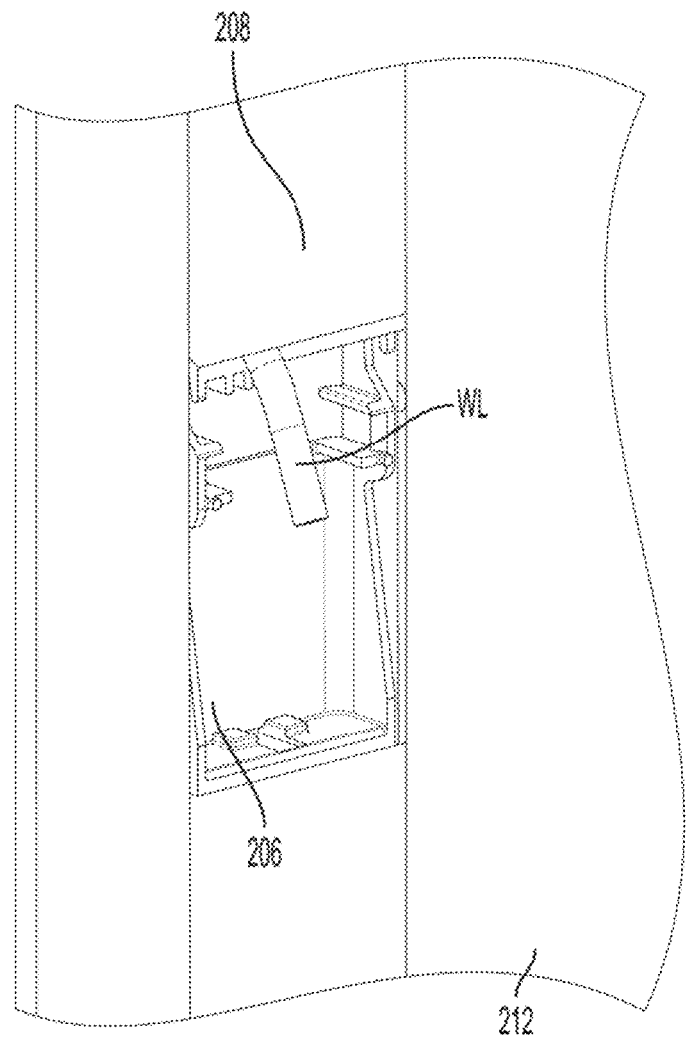
Figure 12:
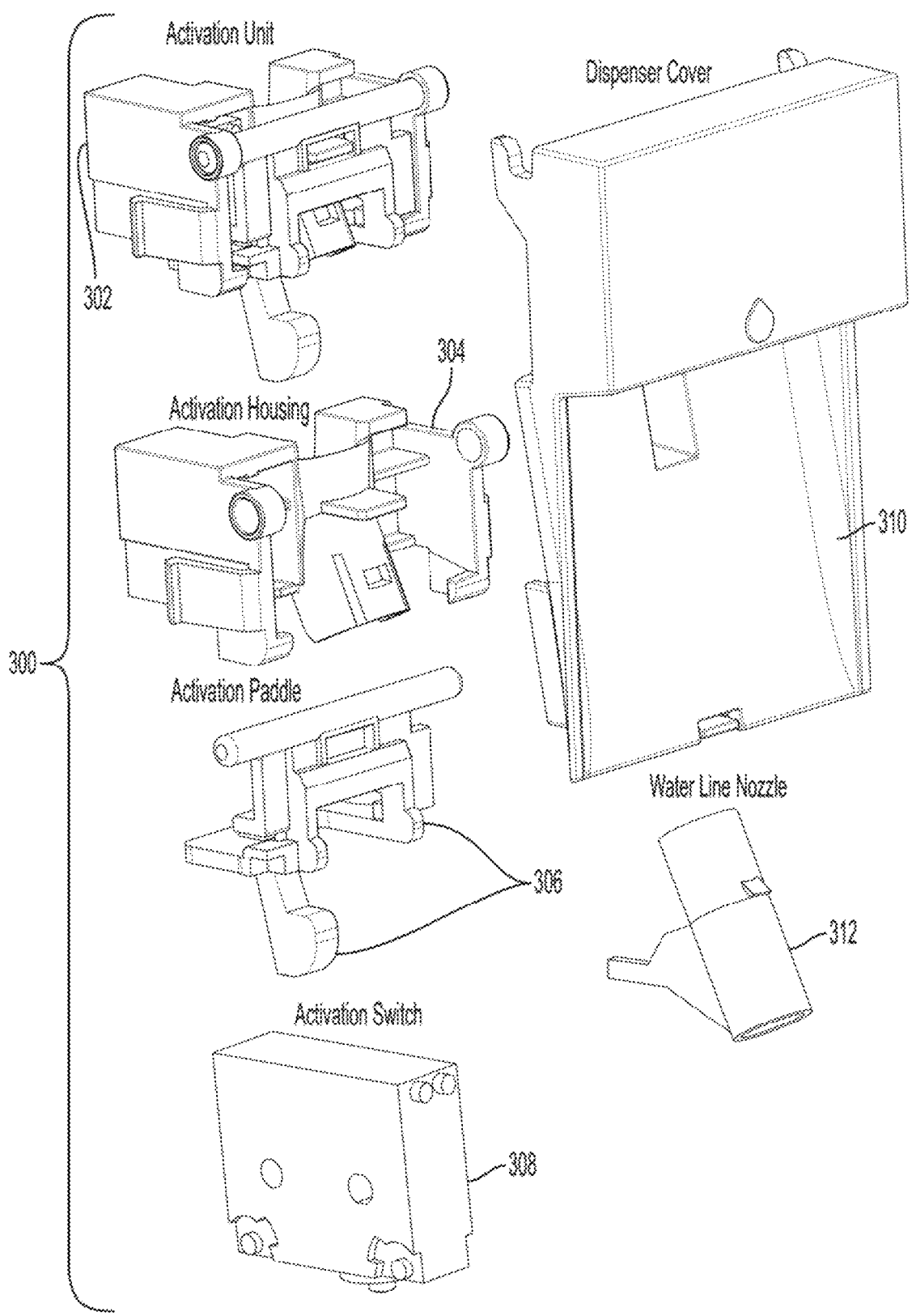
Figure 16:
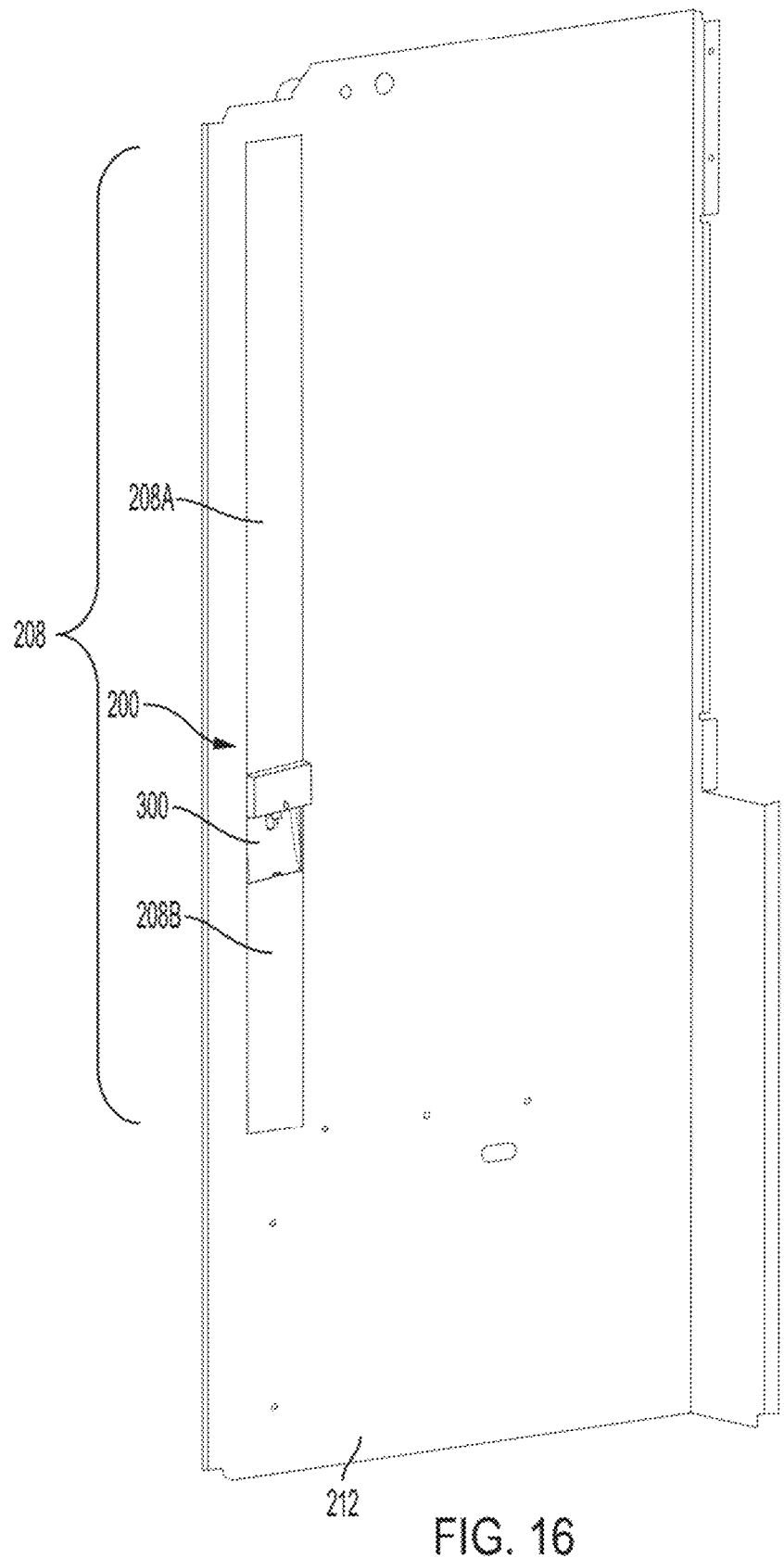
Figure 17A:
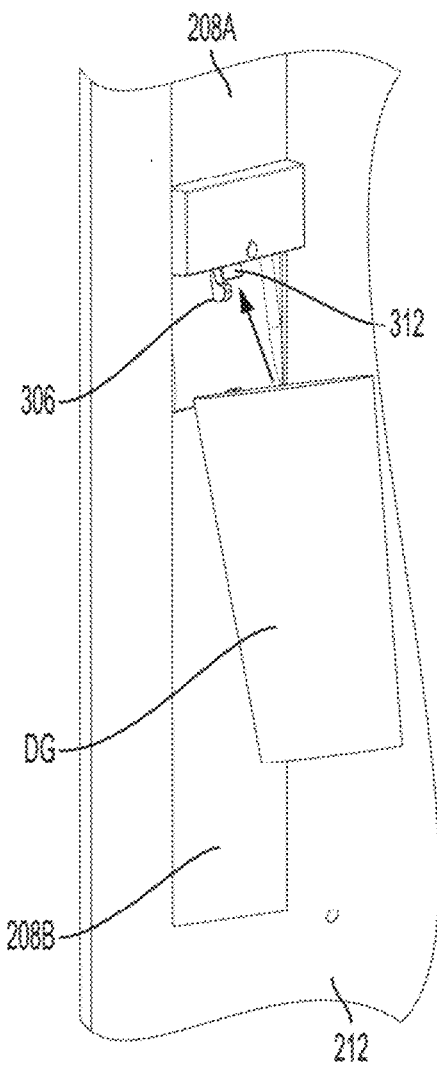
Figure 17B:
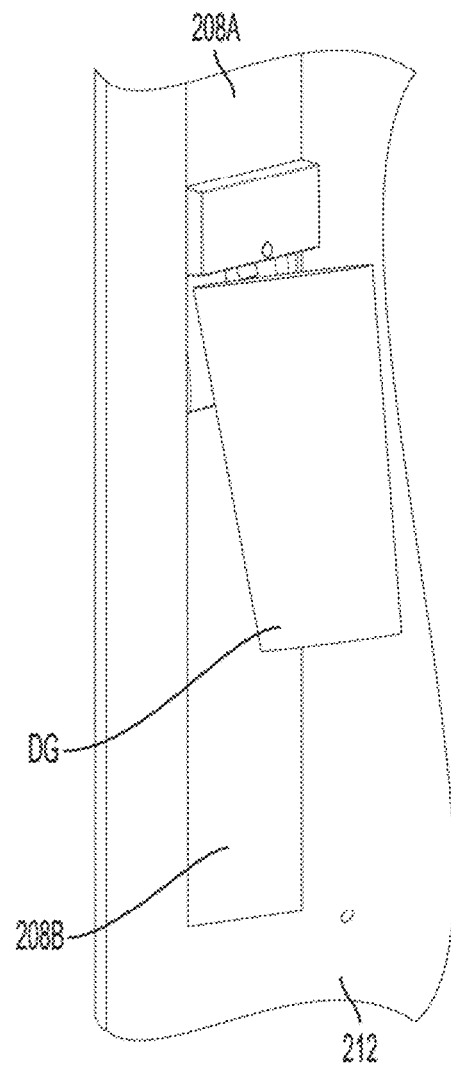
Figure 18:
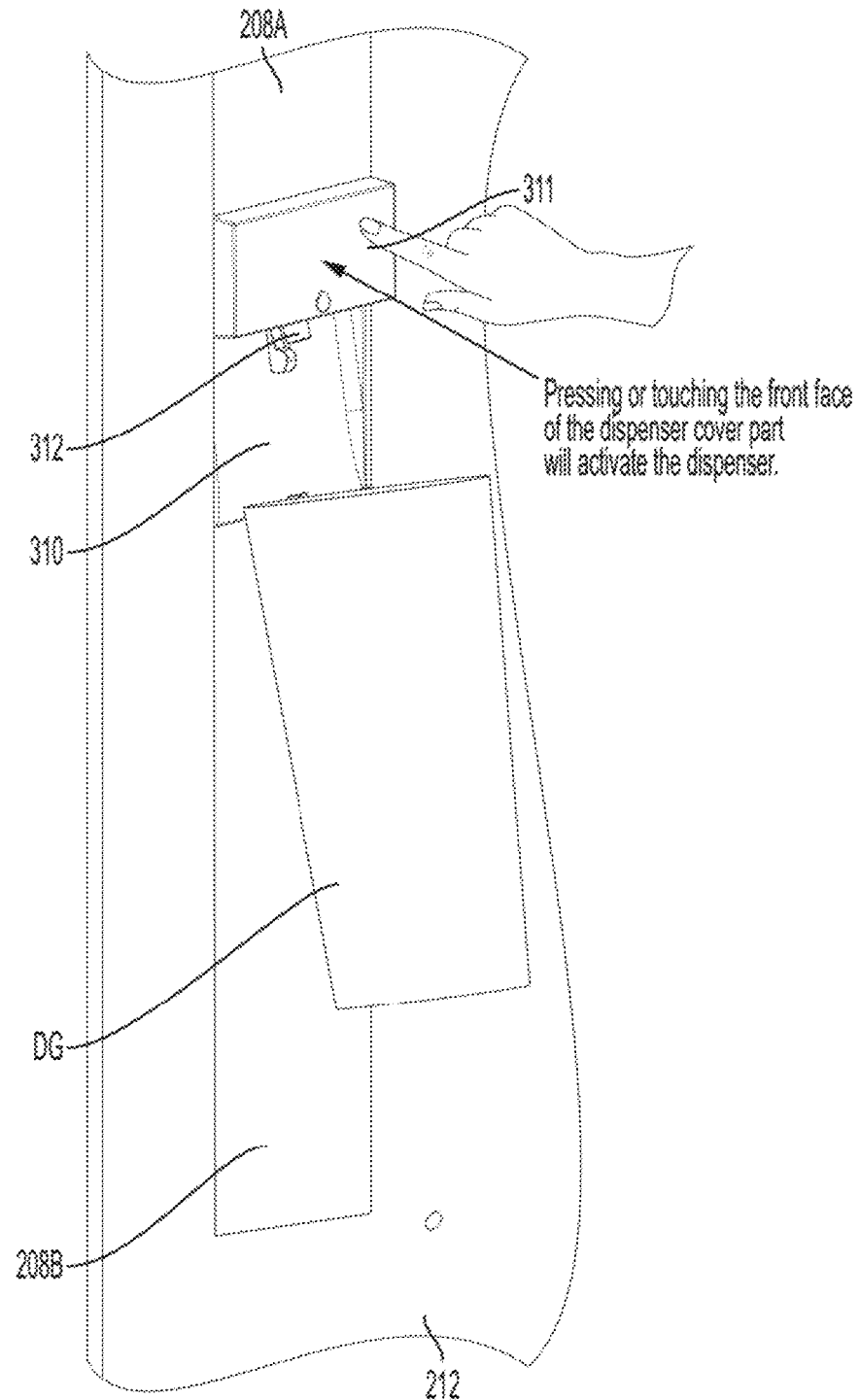
Figure 20C:
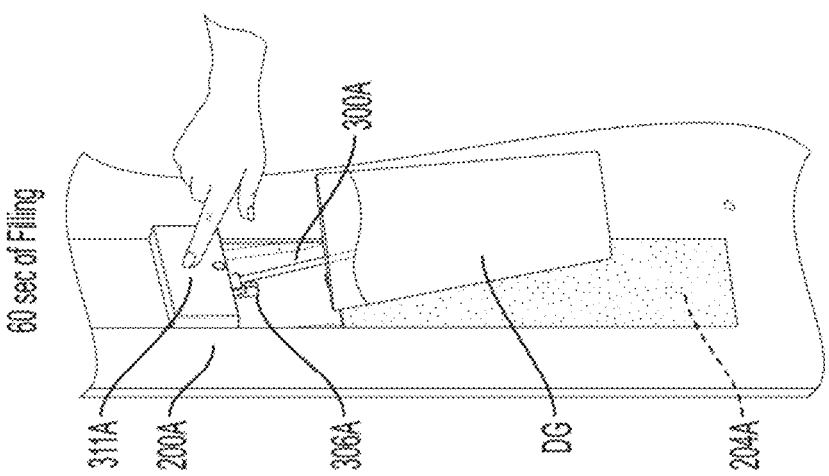
Figure 20B:
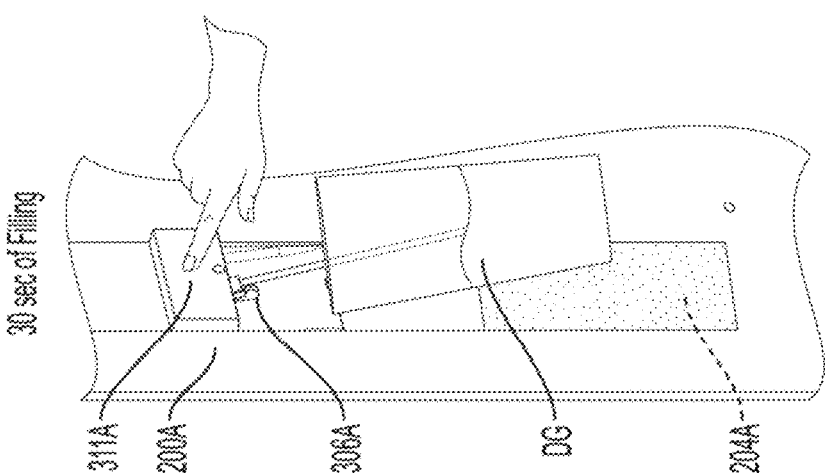
Figure 20A:
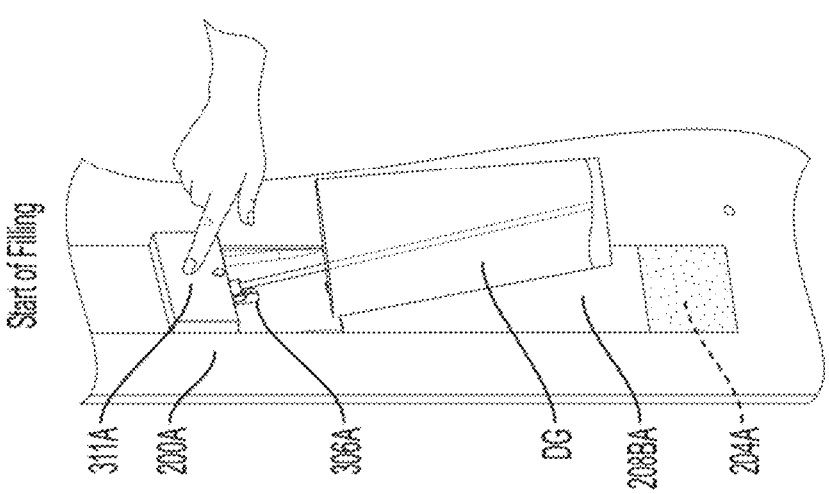
Figure 21A:
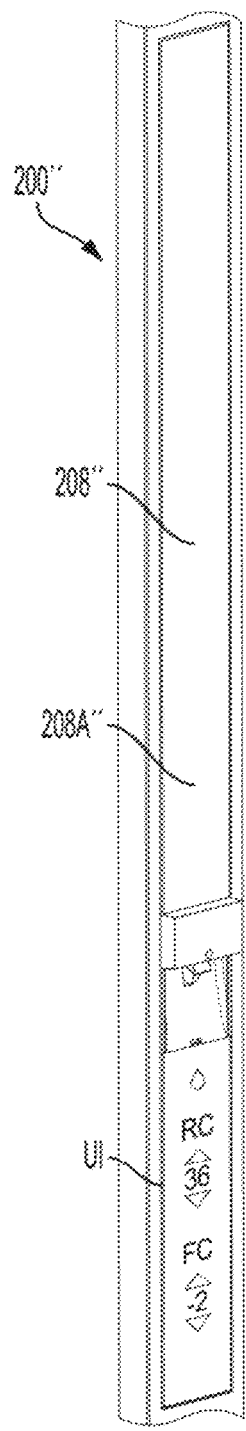
Figure 21B:
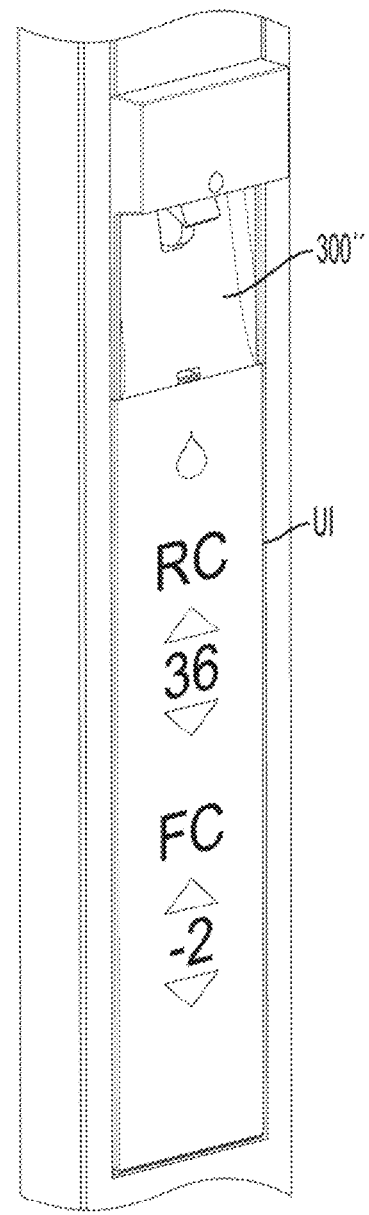
Figure 22:
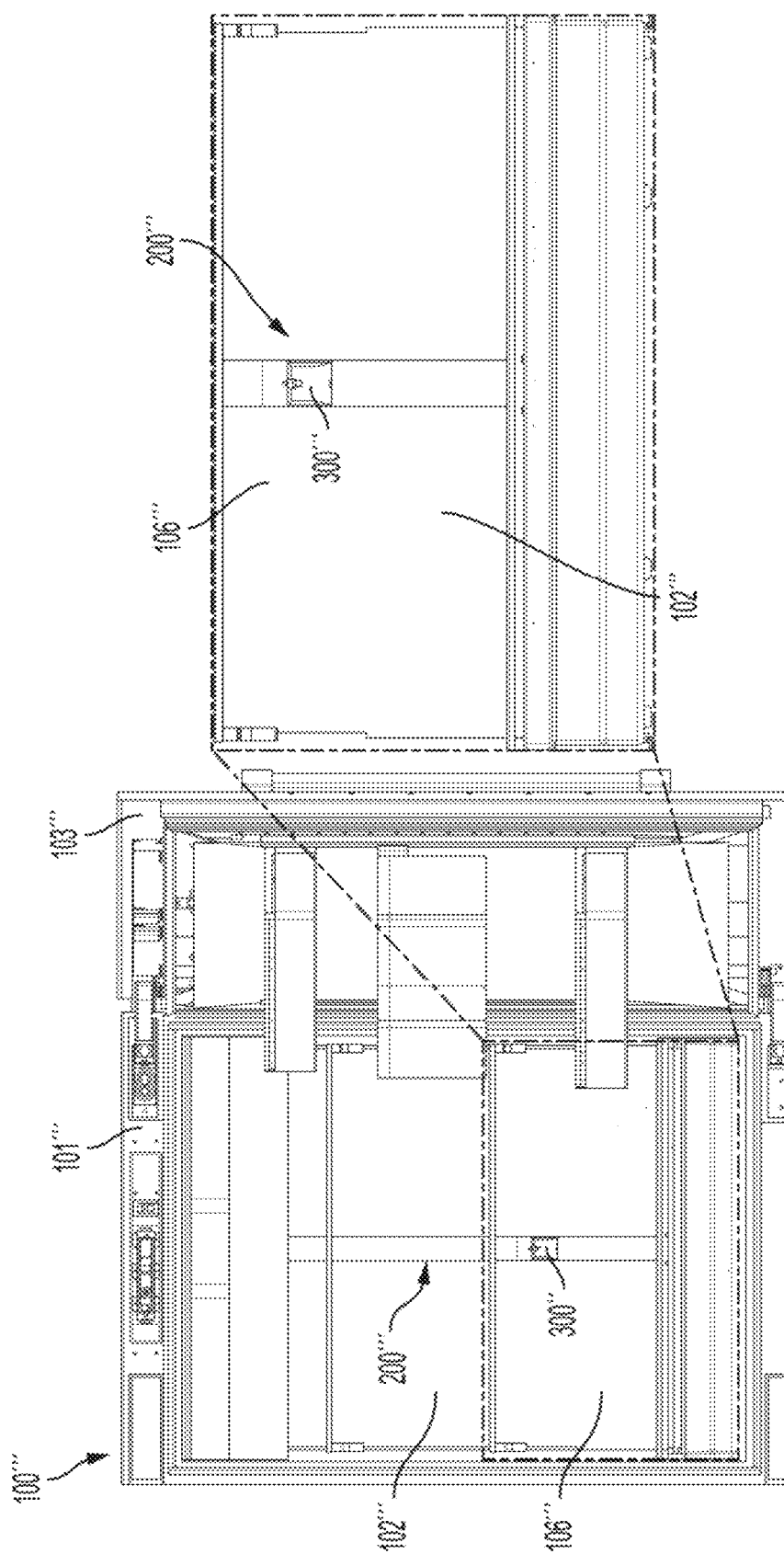

FIGS. 5A, 5B, 5C, 5D, and 5E show some of the main parts of the integrated side light water dispenser module according to an exemplary embodiment consistent with the present disclosure;

FIGS. 6A and 6B show the assembly of the foamed-in housing of the side light water dispenser module to the insulated side of the side wall inner liner according to an exemplary embodiment consistent with the present disclosure;

FIGS. 7A and 7B show the assembly of the water line through the top of the foamed-in housing of the side light water dispenser module according to an exemplary embodiment consistent with the present disclosure;

FIGS. 8A and 8B show the assembly of the LED strip to the foamed-in housing of the side light water dispenser module according to an exemplary embodiment consistent with the present disclosure;

FIGS. 9A, 9B, and 9C show the assembly of the light diverter and dispenser housing to the foamed-in housing of the side light water dispenser module according to an exemplary embodiment consistent with the present disclosure;

FIGS. 10A and 10B show the assembly of the light diffuser to the light diverter and dispenser housing of the side light water dispenser module according to an exemplary embodiment consistent with the present disclosure;

FIG. 11 shows an enlarged view of where the water dispenser is assembled to the foamed-in housing of the side light water dispenser module according to an exemplary embodiment consistent with the present disclosure;

FIG. 12 shows some of the main parts of the water dispenser according to an exemplary embodiment consistent with the present disclosure;

FIGS. 13A and 13B show the assembly of the activation unit to the light diverter and dispenser housing according to an exemplary embodiment consistent with the present disclosure;

FIGS. 14A and 14B show the assembly of the water line nozzle to the water line and to the activation unit according to an exemplary embodiment consistent with the present disclosure;

FIGS. 15A and 15B show the assembly of the water dispenser cover into the light diverter and dispenser housing according to an exemplary embodiment consistent with the present disclosure;

FIG. 16 shows the completed assembly of the side light water dispenser module to the side wall inner liner according to an exemplary embodiment consistent with the present disclosure;

FIGS. 17A and 17B show the paddle activation of the water dispenser using a drinking glass to press the activation paddle to fill the drinking glass according to an exemplary embodiment consistent with the present disclosure;

FIG. 18 shows the button activation of the water dispenser by manually pressing or touching the button to fill a drinking glass according to an exemplary embodiment consistent with the present disclosure;

FIGS. 19A, 19B, and 19C show a further embodiment of the button activation of the water dispenser where a filter status indicator light is included according to an exemplary embodiment consistent with the present disclosure;

FIGS. 20A, 20B, and 20C show a further embodiment of the side light water dispenser module where a lower LED strip is controlled to create a filling effect as the glass is filled with water according to an exemplary embodiment consistent with the present disclosure;

FIGS. 21A and 21B show a further embodiment where a user interface is provided in the lower section of the side light water dispenser module according to an exemplary embodiment consistent with the present disclosure; and FIG. 22 shows a further embodiment where the light water dispenser module is provided in a rear wall of the fresh food compartment according to an exemplary embodiment consistent with the present disclosure.

DETAILED DESCRIPTION OF THE EXEMPLARY EMBODIMENTS

The exemplary embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Moreover, it should be understood that terms such as top, bottom, front, rear, middle, upper, lower, right side, left side, vertical, horizontal, downward, upward, and the like used herein are for orientation purposes with respect to the drawings when describing the exemplary embodiments and should not limit the present invention unless explicitly indicated otherwise in the claims. Also, terms such as substantially, approximately, and about are intended to allow for variances to account for manufacturing tolerances, measurement tolerances, or variations from ideal values that would be accepted by those skilled in the art.

Figure 1:
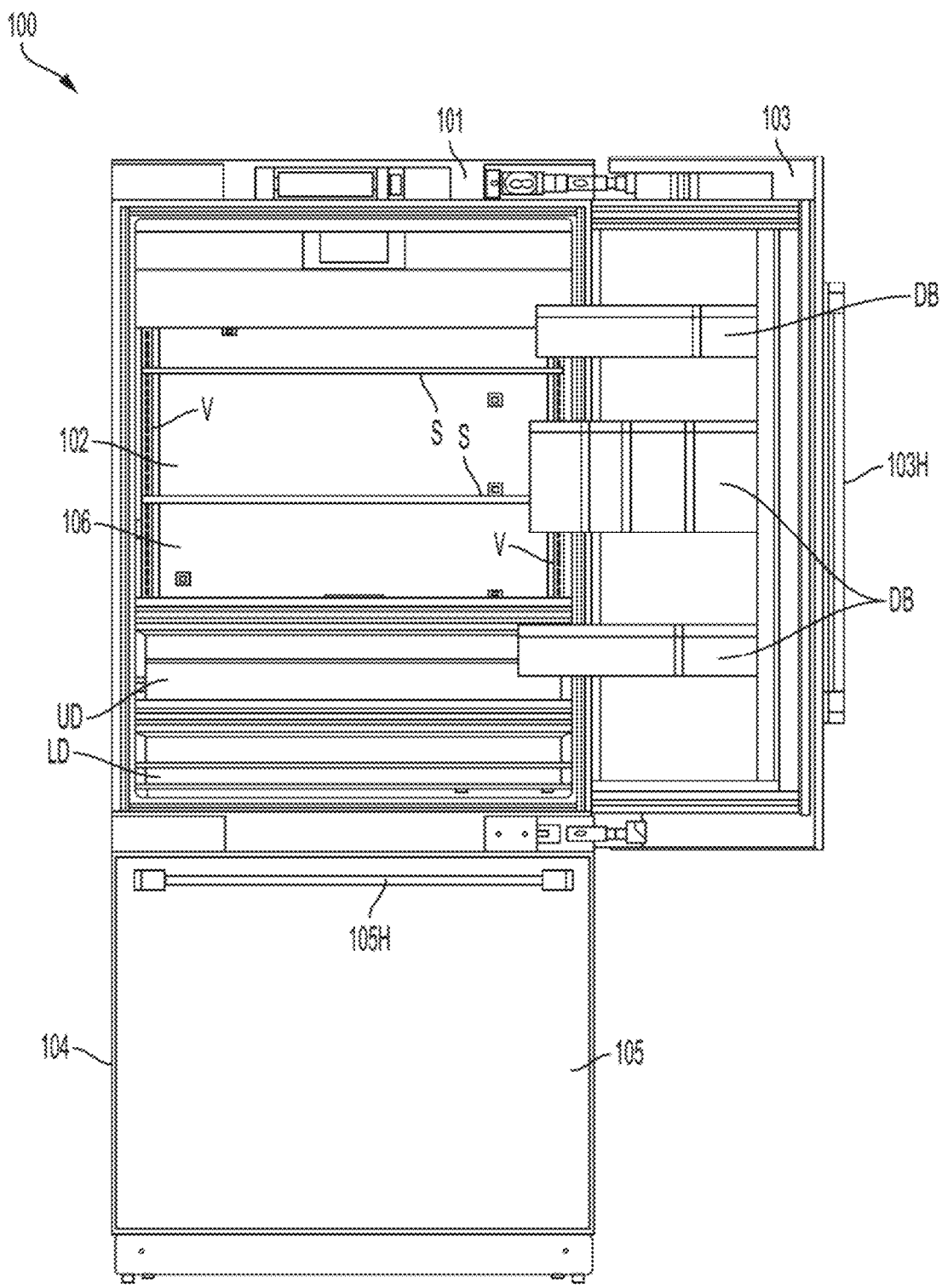
FIG. 1 is a front view showing the inside of a fresh food compartment of a refrigerator appliance according to an exemplary embodiment consistent with the present disclosure.
Figure 2:
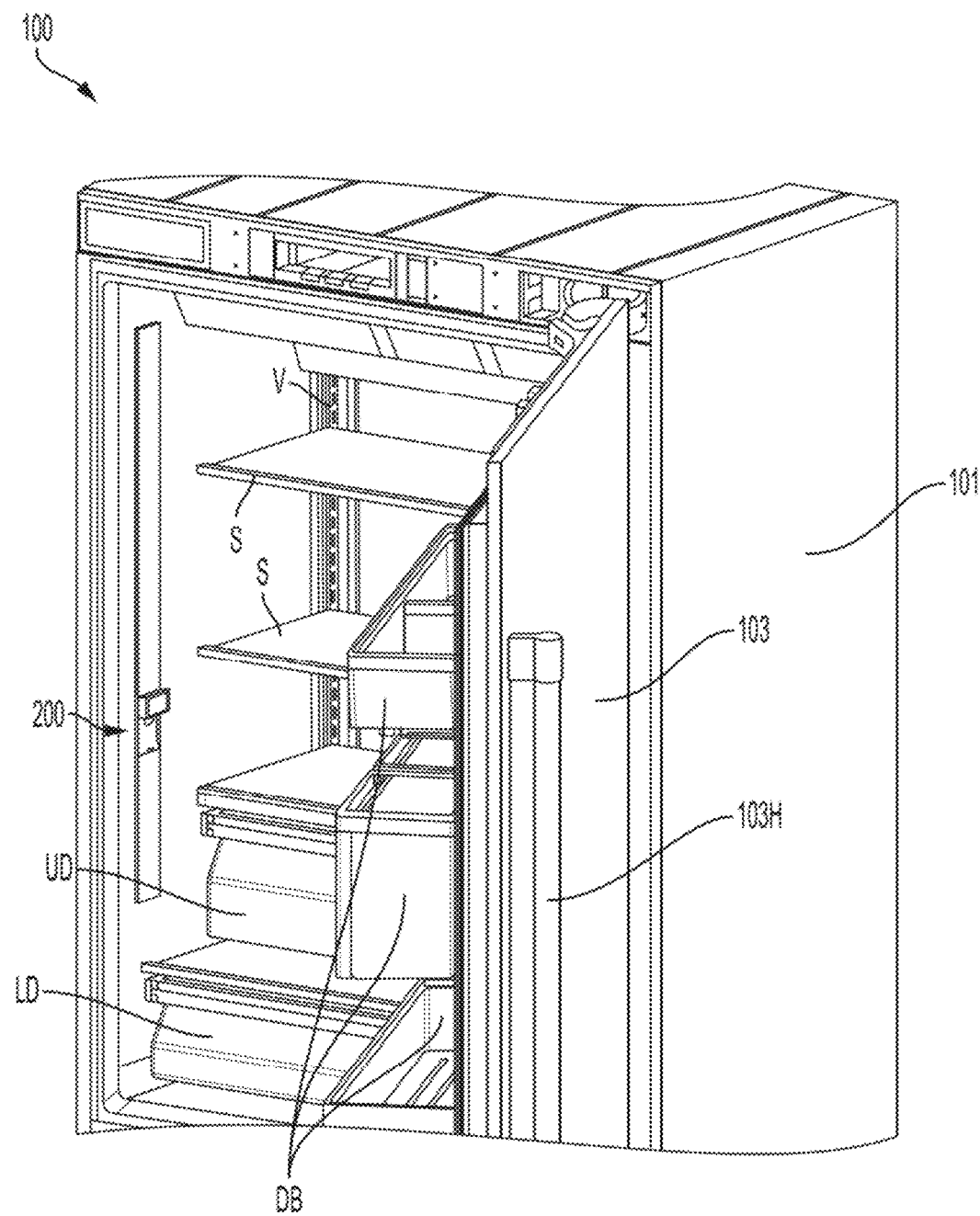
FIG. 2 is a fragmentary perspective view showing the inside of a fresh food compartment of a refrigerator appliance including an internal water dispenser located in the housing of a side light module according to an exemplary embodiment consistent with the present disclosure.
Figure 3:
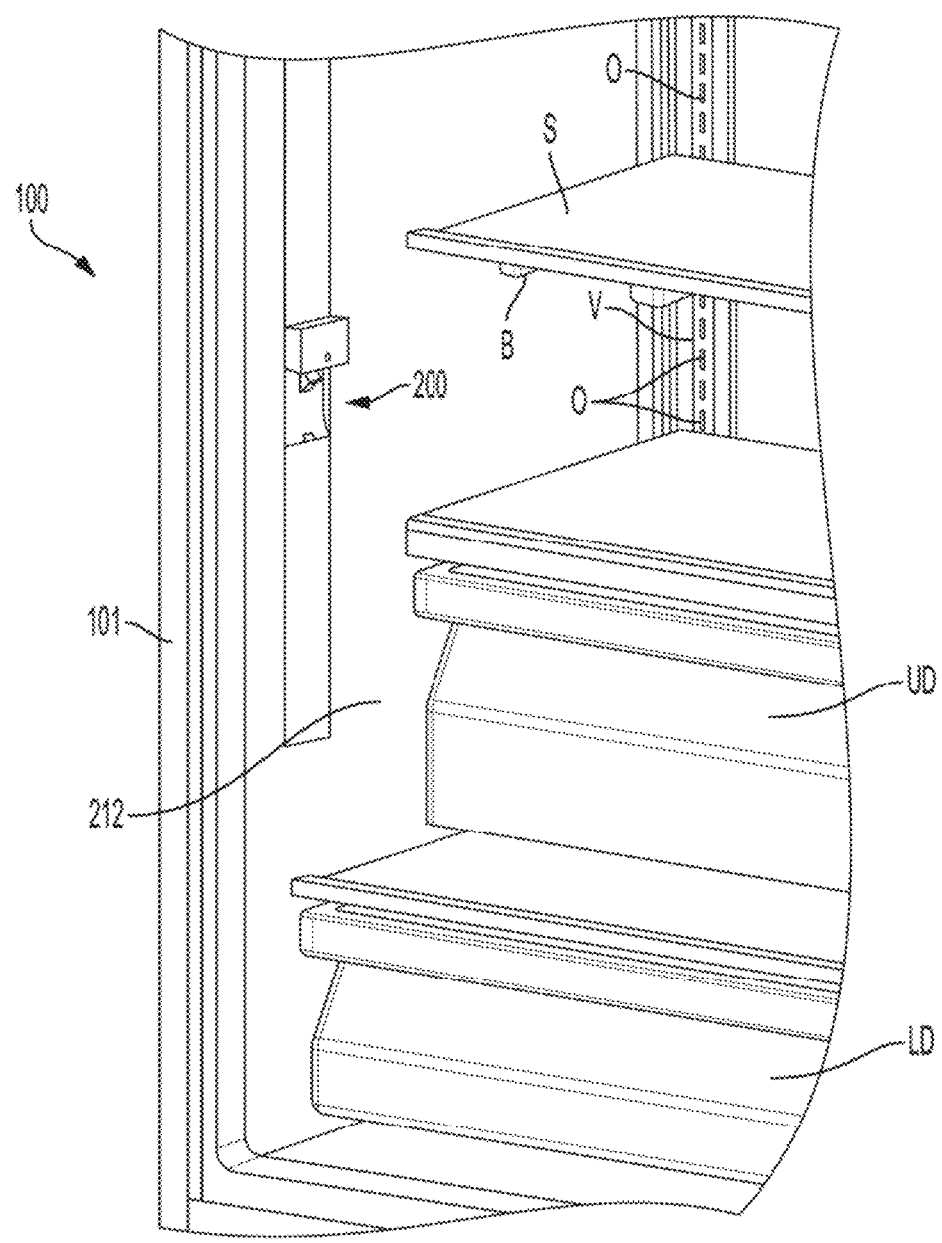
FIG. 3 is an enlarged, fragmentary perspective view showing the inside of a fresh food compartment of a refrigerator appliance including an internal water dispenser located in the housing of a side light module according to an exemplary embodiment consistent with the present disclosure.

FIGS. 1-3 are various views showing the inside of a refrigerator or refrigerator appliance 100 including an integrated side light water dispenser module 200 located in a fresh food compartment 102 according to an exemplary embodiment consistent with the present disclosure. FIGS. 1-3 illustrate the refrigerator appliance 100 with a door 103 open to reveal the fresh food compartment (also referred to as a refrigeration compartment) 102 according to an exemplary embodiment consistent with the present disclosure. The refrigerator appliance 100 can be, but is not limited to, a single door fresh food compartment-bottom mount freezer style refrigerator appliance. More specifically, the refrigerator appliance 100 includes an insulated body 101 having the fresh food compartment 102 located above and being closed by one door 103 having a handle 103H, a freezer compartment 104 (bottom mount style) that can be a pullout type drawer covered by a freezer door 105 having a handle 105H and located below the fresh food compartment 102. The fresh food compartment 102 includes, for example, a number of shelves S, an upper drawer UD, a lower drawer LD, and door bins DB such as in the door 103. The shelves S are supported by shelf support railings or shelf support brackets B (see FIG. 3) that include hooks (not shown) at the rear for connection to and adjustment along vertical tracks V formed by separate metal strips having openings such as slots or holes O therein and arranged along a wall (e.g., a rear wall 106 (see FIG. 1)) of the refrigeration compartment 102. The fresh food or refrigeration compartment 102 is typically set in a range of 1° C. to 6° C., and the freezer compartment 104 is typically set at −18° C. or colder.

Figure 4:
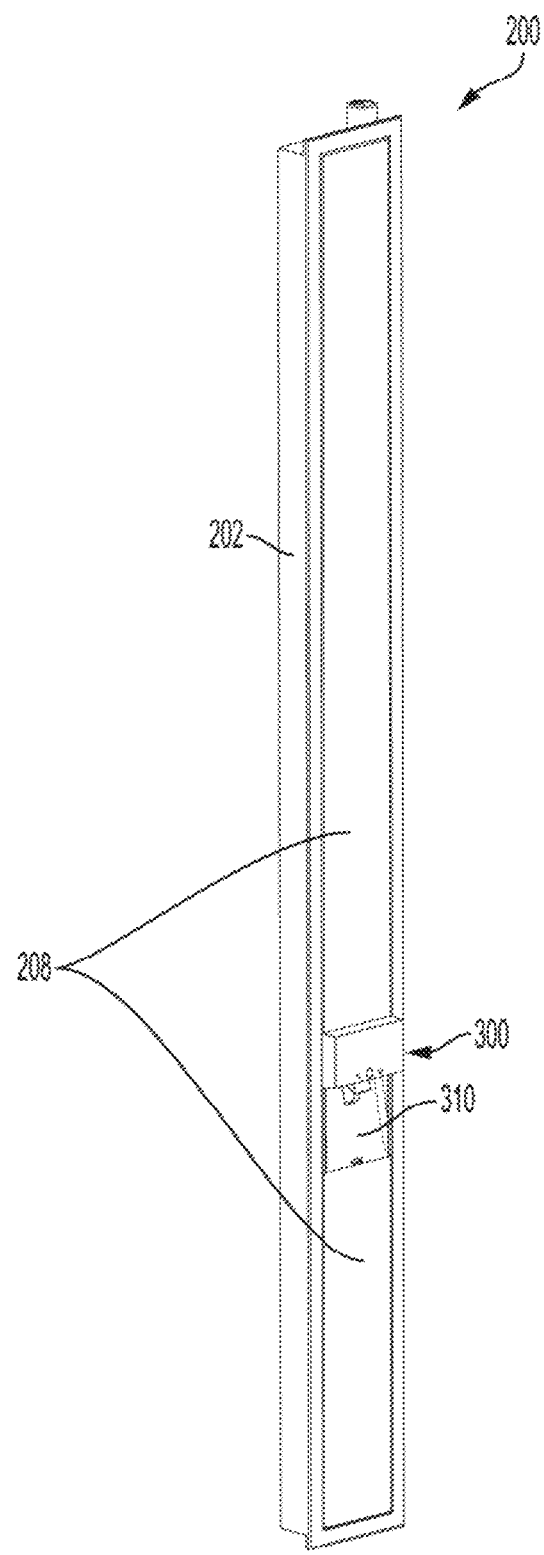
FIG. 4 is a perspective view showing a complete integrated side light water dispenser module according to an exemplary embodiment consistent with the present disclosure.

FIG. 4 shows the complete integrated side light water dispenser module 200 per se according to an exemplary embodiment consistent with the present disclosure. FIGS. 5A-5E show some of the main parts of the integrated side light water dispenser module 200 (see FIG. 4) according to an exemplary embodiment consistent with the present disclosure. FIGS. 6A to 11 show various stages of assembly of the side light water dispenser module 200 according to a method of producing a light-integrated water dispenser module 200. FIGS. 12 to 16 show various stages of assembly of the water dispenser per se. FIGS. 17A to 18 show the various types of activation of the water dispenser. The relationship of the integrated side light water dispenser module 200 with the refrigerator appliance 100 will be discussed in more detail below in connection with FIGS. 1-3, while aspects of the integrated side light water dispenser module 200 per se (see FIG. 4) will be discussed in more detail below in connection with FIGS. 4-18.

As shown in FIGS. 4 and 5A-5E, the integrated side light water dispenser module 200 is configured as an internal water dispenser 300 completely integrated into a light module such as a side wall light module. The integrated side light water dispenser module 200 includes a housing 202 (which is foamed in place in a side wall inner liner 212 (see FIG. 3) of the refrigerator appliance 100 and is therefore also referred to as a foamed-in housing 202), a light emitting diode (LED) in the form of an LED strip 204 having a plurality of LEDs 205 over the length of the LED strip 204 which in turn extends over substantially an entire length of the foamed-in housing 202 (see FIGS. 5A and 5B). The LED strip 204 is positioned next to a light diverter and dispenser housing 206 which in turn is covered by a light diffuser 208. A water line WL is disposed in the foamed-in housing 202 and is configured to pass through an opening at the top of the foamed-in housing 202. A dispenser cover 310 is also visible in FIG. 4. A description of the assembly of the integrated side light water dispenser module 200 to, for example, the side wall inner liner 212 of the refrigerator appliance 100 will now be provided starting with the assembly of the foamed-in housing 202 of the side light water dispenser module 200 to the insulated side of the side wall inner liner 212.

As shown in FIGS. 6A and 6B, the foamed-in housing 202 is first assembled to the insulated side of the side wall inner liner 212 of the refrigerator appliance 100 through a cutout C formed in the side wall inner liner 212. A water guiding conduit WG is then assembled to the top of the foamed-in housing 202. An electrical line or wire EL having an electrical connector EC on an end thereof is fed from the top and bottom (the top one being shown in FIG. 6B) of the foamed-in housing 202. Insulation is then added to the refrigerator appliance 100, so as to permanently fix the foamed-in housing 202 and water guiding conduit WG in the side wall inner liner 212 of the refrigerator appliance 100.

As shown in FIGS. 7A and 7B, after the insulating process has finished, the water line WL is routed through the water guiding conduit WG and comes through the top of the foamed-in housing 202.

FIGS. 8A and 8B show the assembly of the LED strip 204 with LEDs 205 to the foamed-in housing 202 of the side light water dispenser module 200. In particular, after the water line WL has been routed into the foamed-in housing 202, the LED strip 204 is assembled to the foamed-in housing 202. The LED strip 204 is connected from the bottom connector via the electrical wire W and the LED strip 204 is then snapped into a side recess R in the foamed-in housing 202 (see FIG. 8B).

FIGS. 9A, 9B, and 9C show the assembly of the light diverter and dispenser housing 206 to the foamed-in housing 202 of the side light water dispenser module 200. In particular, after the LED strip 204 is assembled, the light diverter and dispenser housing 206 is then assembled. The light diverter and dispenser housing 206 is placed in the foamed-in housing 202 and secured with a fastener such as, for example, one screw (not shown). The geometry of the light diverter and dispenser housing 206 creates the water line guiding conduit for the water line WL through the side light water dispenser module 200. The electrical line or wire EL and electrical connector EC are also protected in the space created.

FIGS. 10A and 10B show the assembly of the light diffuser 208 to the foamed-in housing 202 of the side light water dispenser module 200. In particular, after the light diverter and dispenser housing 206 is assembled, the light diffuser 208 is assembled. The light diffuser 208 is stuck to the light diverter and dispenser housing 206 by, for example, an adhesive or adhesive tape. The light diffuser 208 can be made of, for example, glass or plastic. The light diffuser 208 is divided into an upper piece 208A and a lower piece 208B, with the space where the dispenser cover 310 is to be located being provided therebetween.

FIG. 11 shows an enlarged view of where the water dispenser 300 (see FIGS. 4 and 12) is assembled to the light diverter and dispenser housing 206 of the side light water dispenser module 200. FIG. 12 shows some of the main parts of the water dispenser 300 according to an exemplary embodiment consistent with the present disclosure. In particular, the water dispenser 300 includes an activation unit 302, an activation housing 304, an activation paddle 306, an activation switch 308, the dispenser cover 310, and a water line nozzle 312.

As shown in FIGS. 13A and 13B, the activation unit 302 is first connected to the electrical connector EC (see FIG. 6B) from the top and the water line WL is routed through the center of the activation housing 304. The activation unit 302 is then assembled to the side light water dispenser module 200 by being snapped into the light diverter and dispenser housing 206 (see FIG. 13B).

FIGS. 14A and 14B show the assembly of the water line nozzle 312 to the water line WL and to the activation unit 302. In particular, the water line nozzle 312 is pushed onto the end of the water line WL and snapped into the activation unit 302 (see FIG. 14B). The water line nozzle 312 secures the water outlet in the correct position in the water dispenser 300.

FIGS. 15A and 15B show the assembly of the water dispenser cover 310 into the light diverter and dispenser housing 206. In particular, the dispenser cover 310 is assembled into the light diverter and dispenser housing 206 by, for example, snapping it into position in the light diverter and dispenser housing 206 so as to substantially cover the water dispenser 300 except for the water line nozzle 312 and activation paddle 306.

FIG. 16 shows the completed assembly of the side light water dispenser module 200 to the side wall inner liner 212 according to an exemplary embodiment consistent with the present disclosure. As seen from FIG. 16, the water dispenser 300 is disposed between the upper piece 208A and the lower piece 208B of the light diffuser 208.

FIGS. 17A and 17B show the paddle activation of the water dispenser 300 using a drinking glass DG to press the activation paddle 306 to fill the drinking glass DG. More specifically, after opening the door 103, the user reaches inside the fresh food compartment 102 and presses the drinking glass DG against the activation paddle 306 (see FIG. 17B). This in turn activates the activation switch 308 and opens a water valve (not shown) disposed in the water line WL. Fresh cool water is then fed to the water line nozzle 312 to fill the user's drinking glass DG. Of course, although a drinking glass DG is shown, any container that is capable of holding water can be used as long as it can fit (a smaller container) under the water dispenser 300 and permit the user to activate the activation paddle 306.

FIG. 18 shows the button activation of the water dispenser 300 by manually pressing or touching an activation button to fill the drinking glass DG. For example, the user can press or touch a front face 311 of the dispenser cover 310 at a location above the water line nozzle 312 to fill the user's drinking glass DG. In this regard, note that the button activation can allow containers to be filled that are too large or might not otherwise be shaped to be pressed against the activation paddle 306. Alternatively, a separate and flush button or touch sensitive area could be disposed on the upper part of the front face 311 of the dispenser cover 310.

FIGS. 19A to 22 show various modifications and further embodiments of the side light water dispenser module 200. For example, FIGS. 19A, 19B, and 19C show a further embodiment of the button activation of the water dispenser 300' where a filter status indicator light is included (note that like parts are denoted with like reference numerals but with a prime sign thereafter). More specifically, the front face 311' of the dispenser cover 310' can have a portion FI that is illuminated by LEDs. For example, LEDs and a light pipe can be used. In use, whenever the user dispenses water, the portion FI on the front face 311' will illuminate. The illuminated portion FI will change color to alert the user of their water filter status (e.g., water filter good—white, blue, or green light, water filter near replacement—yellow light, and water filter needs immediate replacement—red light). Also, the fact that the portion FI is illuminated provides a visual indication to the user that the water is dispensing. An indication of when the filter needs to be replaced could also be provided to the user on the front face 311'.

FIGS. 20A, 20B, and 20C show a further embodiment of the side light water dispenser module 200A where a lower LED strip 204A (behind the lower piece of the light diffuser 208BA) is controlled to create a filling effect as the drinking glass DG is filled with water (note that like parts are denoted with like reference numerals but with the letter "A" thereafter). More specifically, the lower LED strip 204A is controlled by individually activating every LED to create a filling effect. For example, if the water valve activates for sixty seconds when the user presses the front face 311A or presses the drinking glass against the activation paddle 306A, then the light intensifies as the sixty second time period progresses. At the start, the lowest LED will turn ON and then each LED on the lower LED strip 204A will turn ON individually and sequentially upwardly over the sixty second time period, thereby showing a filling progress of the water from the water dispenser 300A filling up the drinking glass DG. This feature gives a visual indication to the user of the activation time interval of the water valve in the water system.

FIGS. 21A and 21B show a further embodiment where a user interface UI is provided in the lower section of the side light water dispenser module 200" where the lower piece 208B of the light diverter cover was previously provided (note that like parts are denoted with like reference numerals but with a double prime sign thereafter). The upper piece 208A" of the light diffuser 208" is the same as before. In this case, the user interface UI can control all functionalities of the refrigerator appliance 100, as well as any filling features in connection with the water dispenser 300". For example, FIG. 21B shows the user interface UI with the temperature set function visible and the refrigeration compartment RC temperature set at 36° F. and the freezer compartment FC temperature set at −2° F.

The user interface UI could also display a count while the user is dispensing water into their drinking glass DG. Once the user stops dispensing water, the user interface UI will ask the user if they would like to save this filling time. The user can then name this saved time as a specific container and hit a button (e.g., a touch sensitive button) on the user interface UI to dispense for this particular saved time. For example, if the user dispensed water for 30 seconds, then the UI will ask the user if they want to save this time of 30 seconds. The user can then save this 30 second time as "Jorge's cup" for future dispensing, thus presenting a customized filling option to the user.

The present disclosure offers several advantages over existing internal water dispensing systems. One advantage is the flexibility of having a water dispenser and a light housing share the same space or area inside a refrigerator appliance. The present disclosure also allows for both lighting and water dispenser usability to be optimized within a refrigerator appliance without having to compromise one for the other. Another advantage to the present disclosure is the ability to move the water dispenser and light as close as possible to the front frame of the refrigerator appliance. This will provide the most usable space within the fresh food compartment for the consumer to store food all while providing the consumer with clean water. A technical advantage to the present disclosure is the foamed-in housing and light diverter and dispenser housing form a channel to guide the water line. This reduces the amount of parts in the system and improves the assembly of the sidewall water dispenser.

The present invention has substantial opportunity for variation without departing from the spirit or scope of the present invention. For example, while FIG. 1 shows a single door fresh food compartment-bottom mount freezer style refrigerator appliance 100, the present invention can be utilized in traditional French door-bottom mount (FDBM) configurations with two doors on top including those having one or more intermediate compartments (such as, but not limited to, pullout drawers) that can be operated as either fresh food compartments or freezer compartments and which are located between the main fresh food compartment and the main freezer compartment, a side-by-side refrigerator where the refrigerator compartment and the freezer compartment are disposed side-by-side in a vertical orientation, as well as in other well-known refrigerator configurations, such as but not limited to, top freezer configurations, bottom freezer configurations, configurations where the entire refrigerator unit is a fresh food compartment from top to bottom without a freezer compartment, panel front type refrigeration and freezer configurations, and the like. Moreover, while the internal water dispenser located in the housing of a side light module 200 has been described with reference to an internal water dispenser 300 located in the housing of a side light module in a side wall of the fresh food compartment 102, the present disclosure also contemplates other configurations such as, but not limited to, integrating the side light water dispenser module into other parts of the fresh food compartment. For example, the side light water dispenser module 200''' with water dispenser 300''' can be disposed in or on a rear wall 106''' of the fresh food compartment 102''' (see FIG. 22 where like parts are denoted with like reference numerals but with a triple prime sign thereafter). Also, the various features described in connection with a particular embodiment can be used (mixed and matched) with the other embodiments wherever appropriate.

Those skilled in the art will recognize improvements and modifications to the exemplary embodiments of the present invention. All such improvements and modifications are considered within the scope of the concepts disclosed herein and the claims that follow.

What is claimed is:

1. A refrigerator comprising:
   a fresh food compartment defined by a top wall, a bottom wall, a rear wall, two side walls, and at least one door;
   a light module having a housing and being disposed in or on at least the rear wall or one of the two side walls of the fresh food compartment, the light module having a plurality of light emitting diodes (LEDs) positioned along an element on the housing to illuminate the fresh food compartment, wherein at least a portion of the plurality of LEDs is configured to be activated individually to present a visual indication; and
   a water dispenser located in the housing of the light module, the water dispenser being accessible from inside the fresh food compartment and integrated with the light module such that at least one section of the element of the light module is configured to be unobstructed by a receptacle positioned to receive water provided by the water dispenser, wherein the water dispenser comprises a dispenser cover having a front face positioned above a water line nozzle from which the water dispenser is configured to provide water, wherein the front face is configured to remain substantially parallel to the housing of the light module in response to user input and has a portion that is configured to be illuminated by a light source such that the portion of the front face is configured to be illuminated whenever the water dispenser dispenses water based on an activation switch positioned within the water dispenser being activated; and
   wherein the plurality of LEDs is part of an LED strip positioned to extend above and below the water dispenser, and wherein at least a portion of the LED strip corresponding to a position of the water dispenser is free from LEDs.

2. The refrigerator of claim 1, wherein the water dispenser located in the housing of the light module is disposed on a left side wall of the two side walls of the fresh food compartment.

3. The refrigerator of claim 1, wherein the light module comprises:
   a light diffuser positioned to cover the plurality of LEDs, wherein the water dispenser is positioned between an upper piece of the light diffuser and a lower piece of the light diffuser.

4. The refrigerator of claim 1, wherein the housing of the light module comprises a foamed-in housing, and wherein the LED strip extends over substantially an entire length of the foamed-in housing.

5. The refrigerator of claim 4, wherein a water line is routed through a water guiding conduit and comes through a top of the foamed-in housing.

6. The refrigerator of claim 5, wherein the light module comprises a light diverter and dispenser housing that is disposed in the foamed-in housing and secured thereto, such that the light diverter and dispenser housing creates a water line guiding conduit for the water line.

7. The refrigerator of claim 1, wherein the water dispenser includes an activation housing having an activation paddle which activates the activation switch, and the water line nozzle.

8. The refrigerator of claim 7, wherein the housing of the light module comprises a foamed-in housing,
wherein the light module comprises a light diverter and dispenser housing that is disposed in the foamed-in housing and secured thereto, and
wherein the dispenser cover is assembled into the light diverter and dispenser housing, so as to substantially cover the water dispenser except for the water line nozzle and the activation paddle.

9. The refrigerator of claim 8, wherein the water dispenser comprises an activation button, such that a user can press or touch the front face of the dispenser cover at a location above the water line nozzle to dispense water.

10. The refrigerator of claim 1, wherein the light source of the dispenser cover comprises one or more light emitting diodes, and wherein the portion on the front face of the dispenser cover illuminates and changes color to alert a user of a water filter status.

11. The refrigerator of claim 1, wherein the light module comprises a lower light emitting diode (LED) strip that is configured to create a filling effect by illuminating sequentially upwardly as a container is filled with water.

12. The refrigerator of claim 1, wherein the light module comprises a user interface that is configured to control functionalities of the refrigerator.

13. The refrigerator of claim 12, wherein the user interface is configured to present a customized filling option to a user.

14. The refrigerator of claim 1, further comprising a user interface configured to present a customized filling option to a user.

15. A wall light-integrated water dispenser for use inside a refrigerator appliance, the wall light-integrated water dispenser comprising:
a light module having a housing and a plurality of light emitting diodes (LEDs) positioned along the housing to illuminate a fresh food compartment, the light module configured to be disposed in or on a wall of the fresh food compartment, wherein at least a portion of the plurality of LEDs is configured to be activated individually to present a visual indication; and
a water dispenser integrated with the housing of the light module such that at least one section of the element of the light module is configured to be unobstructed by a receptacle positioned to receive water provided by the water dispenser, wherein the water dispenser comprises a dispenser cover having a front face positioned above a water line nozzle from which the water dispenser is configured to provide water, wherein the front face is configured to remain substantially parallel to the housing of the light module in response to user input and has a portion that is configured to be illuminated by a light source such that the portion of the front face is configured to be illuminated whenever the water dispenser dispenses water based on an activation switch positioned within the water dispenser being activated;
wherein the light module comprises a light diffuser positioned to cover the plurality of LED, wherein the water dispenser is positioned between an upper piece of the light diffuser and a lower piece of the light diffuser; and
wherein the plurality of LEDs is part of an LED strip positioned to extend above and below the water dispenser, and wherein at least a portion of the LED strip corresponding to a position of the water dispenser is free from LEDs.

16. The wall light-integrated water dispenser of claim 15, wherein the water dispenser integrated with the housing of the light module is configured to be disposed on a left side wall of the fresh food compartment.

17. The wall light-integrated water dispenser of claim 15, wherein the housing of the light module comprises a foamed-in housing, and wherein the LED strip extends over substantially an entire length of the foamed-in housing.

18. A method of producing a light-integrated water dispenser module, comprising the steps of:
assembling a foamed-in housing to an insulated side of a side wall inner liner of a refrigerator appliance through a cutout in the side wall inner liner;
assembling a water guiding conduit to a top of the foamed-in housing and routing an electrical line having an electrical connector on an end thereof from at least one of the top or a bottom of the foamed-in housing;
adding insulation to the refrigerator appliance, so as to permanently fix the foamed-in housing and the water guiding conduit in the side wall inner liner of the refrigerator appliance;
routing a water line through the water guiding conduit and through the top of the foamed-in housing;
assembling a light emitting diode (LED) strip to the foamed-in housing and connecting the LED strip to the electrical connector, the LED strip comprising a plurality of LEDs positioned along the foamed-in housing, wherein at least a portion of the plurality of LEDs is configured to be activated individually to present a visual indication;
assembling a light diverter and dispenser housing to the foamed-in housing;
assembling a light diffuser to the light diverter and dispenser housing of the foamed-in housing to illuminate an interior of the refrigerator appliance;
assembling a water dispenser to the light diverter and dispenser housing such that at least one section of the light diverter and dispenser housing element is configured to be unobstructed by a receptacle positioned to receive water provided by the water dispenser, wherein the water dispenser comprises a dispenser cover having a front face positioned above a water line nozzle from which the water dispenser provides water, wherein the front face remains substantially parallel to the foamed-in housing in response to user input and has a portion that is illuminated by a light source such that the portion of the front face illuminates whenever the water dispenser dispenses water based on an activation switch positioned with the water dispenser being activated; and assembling the dispenser cover into the light diverter and dispenser housing; and
assembling the plurality of LEDs is part of an LED strip positioned to extend above and below the water dispenser, and wherein at least a portion of the LED strip corresponding to a position of the water dispenser is free from LEDs.

* * * * *